United States Patent
Kim et al.

(10) Patent No.: US 8,737,494 B2
(45) Date of Patent: May 27, 2014

(54) METHOD AND SYSTEM FOR QUANTIZATION FOR A GENERAL BEAMFORMING MATRIX IN FEEDBACK INFORMATION

(75) Inventors: Joonsuk Kim, San Jose, CA (US); Eric Ojard, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 2654 days.

(21) Appl. No.: 11/393,224

(22) Filed: Mar. 30, 2006

(65) Prior Publication Data

US 2007/0160011 A1 Jul. 12, 2007

Related U.S. Application Data

(60) Provisional application No. 60/757,273, filed on Jan. 9, 2006.

(51) Int. Cl.
*H04K 1/10* (2006.01)
*H04W 4/00* (2009.01)

(52) U.S. Cl.
USPC .......................................... 375/260; 370/338

(58) Field of Classification Search
USPC .................................. 370/343; 375/260, 267
See application file for complete search history.

(56) References Cited

U.S. PATENT DOCUMENTS

2006/0039489 A1* 2/2006 Ikram et al. ................... 375/260
2006/0146725 A1 7/2006 Li et al.
2006/0285531 A1* 12/2006 Howard et al. ............... 370/343

* cited by examiner

*Primary Examiner* — Michael Faragalla
(74) *Attorney, Agent, or Firm* — Garlick & Markison; Bruce E. Garlick

(57) ABSTRACT

Aspects of a method and system for utilizing Givens rotation expressions for quantization for a general beamforming matrix in feedback information. In one aspect of the invention, feedback information is computed at the receiving MIMO wireless device based on a geometric mean decomposition (GMD) method. The feedback information may include a matrix that describes a wireless medium. The matrix may represent a multiplicative product of at least one rotation matrix and at least one diagonal phase rotation matrix. Each of the rotation matrices may include at least one matrix element whose value is based on Givens rotation angle. The transmitting MIMO wireless device may subsequently transmit a plurality of signals via the wireless medium based on the received matrix information. The signal strength and/or signal to noise ratio (SNR) measurement (as measured in decibels, for example) associated with each of the transmitted plurality of signals may be about equal.

26 Claims, 9 Drawing Sheets

METHOD AND SYSTEM FOR QUANTIZATION FOR A GENERAL BEAMFORMING MATRIX IN FEEDBACK INFORMATION

CROSS-REFERENCE TO RELATED APPLICATIONS/INCORPORATION BY REFERENCE

This application makes reference to, claims priority to, and claims the benefit of U.S. Provisional Application Ser. No. 60/757,273 filed Jan. 9, 2006.

This application also makes reference to:
U.S. patent application Ser. No. 11/327,690 filed on Jan. 6, 2006;
U.S. patent application Ser. No. 11/327,752 filed on Jan. 6, 2006; and
U.S. application Ser. No. 11/052,389 filed Feb. 7, 2005.

Each of the above stated applications is hereby incorporated herein by reference in its entirety.

FIELD OF THE INVENTION

Certain embodiments of the invention relate to wireless communication. More specifically, certain embodiments of the invention relate to a method and system for quantization for a general beamforming matrix in feedback information.

BACKGROUND OF THE INVENTION

Multiple input multiple output (MIMO) systems are wireless communications systems that are specified in resolution 802.11 from the Institute of Electrical and Electronics Engineers (IEEE). A MIMO system that receives a signal Y may compute a channel estimate matrix, H, based on the received signal. The signal may comprise information generated from a plurality of information sources. Each such information source may be referred to as a spatial stream. A transmitting MIMO system may utilize a plurality of transmitting antennas when transmitting the signal Y. A receiving MIMO system may utilize a plurality of receiving antennas when receiving the signal Y. The channel estimate matrix for a downlink RF channel, $H_{down}$, may describe a characteristic of the wireless transmission medium in the transmission path from a transmitter, to a receiver. The channel estimate for an uplink RF channel, $H_{up}$, may describe a characteristic of the wireless transmission medium in the transmission path from the receiver to the transmitter.

According to the principle of reciprocity, a characteristic of the wireless transmission medium in the transmission path from the transmitter to the receiver may be assumed to be identical to a corresponding characteristic of the wireless transmission medium in the transmission path from the receiver to the transmitter. However, the channel estimate matrix $H_{down}$ may not be equal to a corresponding channel estimate matrix for an uplink RF channel $H_{up}$. For example, a noise level, for example an ambient noise level, in the vicinity of the transmitter may differ from a noise level in the vicinity of the receiver. Similarly, an interference level, for example electro-magnetic interference due to other electro-magnetic devices, in the vicinity of the transmitter may differ from an interference level in the vicinity of the receiver. At a transmitter, or receiver, there may also be electrical cross-coupling, for example leakage currents, between circuitry associated with a receiving antenna, or a transmitting antenna, and circuitry associated with another receiving antenna, or another transmitting antenna.

The principle of reciprocity, wherein it may be assumed that $H_{up}=H_{down}$, may also be based on the assumption that specific antennas at a transmitter or receiver are assigned for use as transmitting antennas, and/or assigned for use as receiving antennas. At the transmitter, a number of receiving antennas, $N_{RX}$, utilized at the receiver may be assumed. At the receiver, a number of transmitting antennas, $N_{TX}$, utilized at the transmitter may be assumed. If the assignments of at least a portion of the antennas at the transmitter are changed, the corresponding channel estimate matrix $H'_{up}$ may not be equal $H_{down}$. Similarly, if the assignments of at least a portion of the antennas at the receiver are changed, the corresponding channel estimate matrix $H'_{down}$ may not be equal $H_{up}$. Consequently, after reassignment of antennas at the transmitter and/or receiver, the principle of reciprocity may not be utilized to characterize communications between the transmitter and the receiver when $H_{up}$ does not equal $H'_{down}$, when $H'_{up}$ does not equal $H_{down}$, or when $H'_{up}$ does not equal $H'_{down}$.

The principle of reciprocity may enable a receiving wireless local area network (WLAN) device A to receive a signal Y from a transmitting WLAN device B, and to estimate a channel estimate matrix $H_{down}$ for the transmission path from the transmitting WLAN device B to the receiving WLAN device A. Based on the channel estimate matrix $H_{down}$, the WLAN device A may transmit a subsequent signal Y, via an uplink RF channel, to the WLAN device B based on the assumption that the channel estimate matrix $H_{up}$ for the transmission path from the transmitting WLAN device A to the receiving WLAN device B may be characterized by the relationship $H_{up}=H_{down}$. When the WLAN devices A and B are MIMO systems, corresponding beamforming matrices may be configured and utilized for transmitting and/or receiving signals at each WLAN device.

Beamforming is a method for signal processing that may allow a transmitting MIMO system to combine a plurality of spatial streams in a transmitted signal Y. Beamforming is also a method for signal processing that may allow a receiving MMO system to separate individual spatial streams in a received signal Y.

As a result of a failure of an assumed condition for the principle of reciprocity, a beamforming matrix at the transmitting WLAN device, and/or a beamforming matrix at the receiving WLAN device, may be configured incorrectly. In a transmitted signal Y, from the perspective of a signal associated with an $i^{th}$ spatial stream, a signal associated with a $j^{th}$ spatial stream may represent interference or noise. Incorrect configuration of one or more beamforming matrices may reduce the ability of the receiving WLAN device to cancel interference between an $i^{th}$ spatial stream and a $j^{th}$ spatial stream. Consequently, the received signal Y may be characterized by reduced signal to noise ratios (SNR). There may also be an elevated packet error rate (PER) when the receiving WLAN device decodes information contained in the received signal Y. This may, in turn, result in a reduced information transfer rate, as measured in bits/second, for communications between the transmitting WLAN device and the receiving WLAN device.

In some MIMO systems, a transmitting WLAN device may transmit a plurality of spatial streams based on channel state information at the transmitter (CSIT). The CSIT may be based on feedback information sent from the receiving WLAN device B to the transmitting WLAN device A. Based on the CSIT, the transmitting WLAN device A may compute estimated values for the channel estimate matrix $H_{down}$.

In a typical MIMO system, the transmitting WLAN device A may transmit a plurality of information bits simultaneously via the plurality of transmitting antennas. The transmitting WLAN device A may allocate a portion of the plurality of information bits for transmission via at least a portion of the plurality of transmitting antennas. Each allocated portion of information bits may be error correction coded to enable the receiving WLAN device B to correctly detect the binary values associated with each of the transmitted information bits in a received signal. A received bit for which the receiving WLAN device detects an incorrect binary value may be referred to as a bit error. The rate, as measured over a time duration at which bit errors occur, may be referred to as a bit error rate (BER).

In some MIMO systems, the spatial streams transmitted by the transmitting WLAN device A may be characterized by the bit error rate. An error correction coding method may be characterized by the number of error correction bits that are transmitted with a given number of information bits. The ratio of information bits to the total number of error correction and information bits may be referred to as a coding rate. Spatial streams that are transmitted by a transmitting WLAN device A utilizing larger values for the coding rate, may be associated with higher BERs at the receiving WLAN device B in comparison to spatial streams that are transmitted utilizing smaller values for the coding rate. A larger value for the coding rate may be referred to as a weak coding rate in comparison to a smaller value of the coding rate. The error correction coding may enable the receiving WLAN device B to reduce the BER.

In some MIMO systems that utilize CSIT, the signal strength and/or signal to noise ratio (SNR) may vary among the transmitted spatial streams. In such MIMO systems that utilize higher, or weaker, coding rates, the BER performance may not be acceptable.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for utilizing Givens rotation expressions for quantization for a general beamforming matrix in feedback information, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
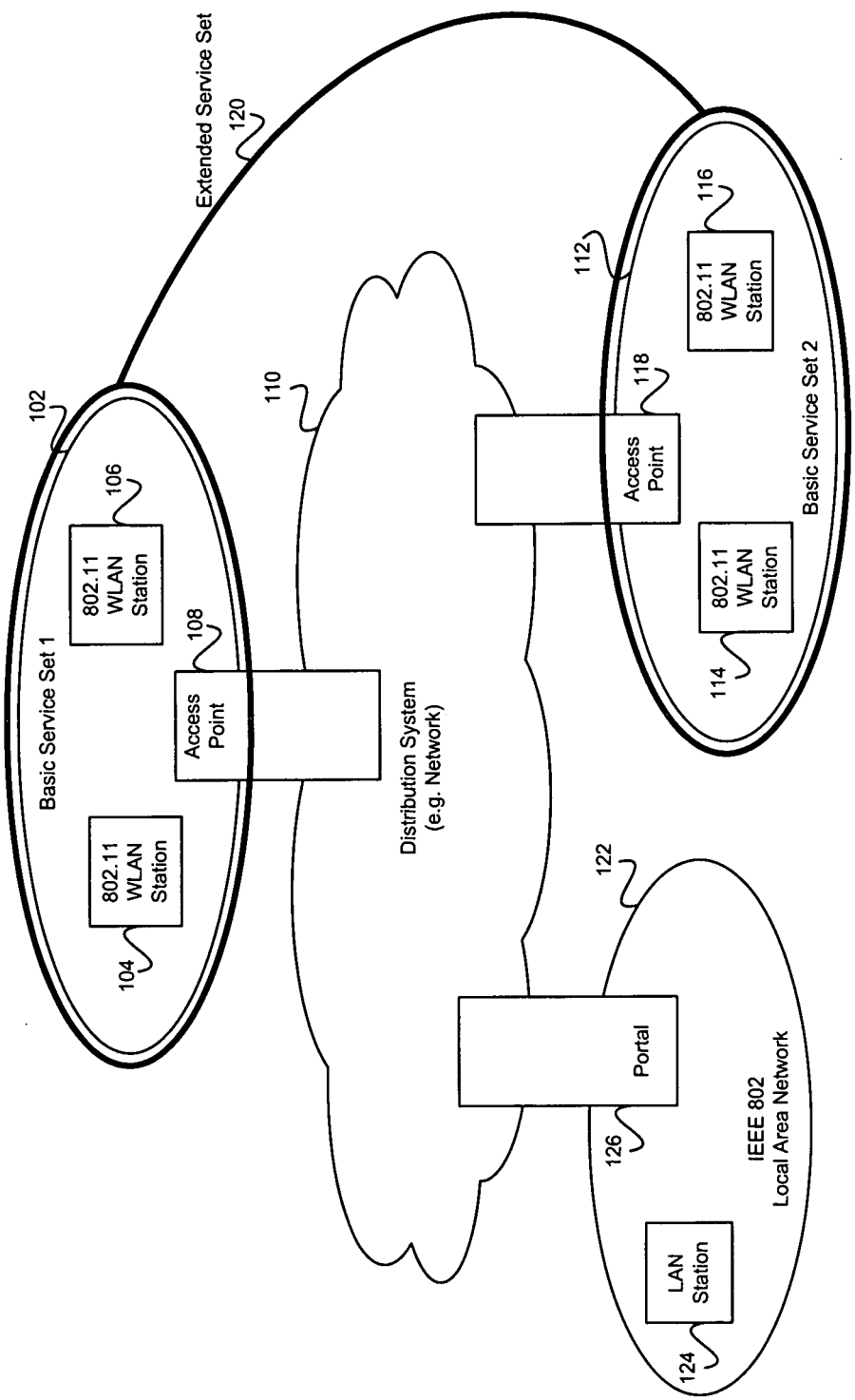
FIG. 1 is a block diagram of an exemplary system for wireless data communications, which may be utilized in connection with an embodiment of the invention.

Certain embodiments of the invention relate to a method and system for quantization for a general beamforming matrix in feedback information. Various embodiments of the invention may be utilized to enable communications within wireless communications systems between a transmitting multiple input multiple output (MIMO) wireless device and a receiving MIMO wireless device. In one aspect of the invention, feedback information may be computed at the receiving MIMO wireless device based on signals received from the transmitting MIMO wireless device. Any of a plurality of beamforming methods, for example geometric mean decomposition (GMD) or singular value decomposition (SVD), may be utilized. The feedback information may comprise a matrix that describes a wireless medium. The matrix may represent a multiplicative product of at least one rotation matrix and at least one diagonal phase rotation matrix. Each of the rotation matrices may comprise at least one matrix element whose value is based on Givens rotation angle. The transmitting MIMO wireless device may subsequently transmit a plurality of signals via the wireless medium based on the received matrix information. The signal strength and/or signal to noise ratio (SNR) measurement (as measured in decibels, for example) associated with each of the transmitted plurality of signals may be about equal.

Various embodiments of the invention may exhibit improved bit error rate performance (BER) when utilizing weaker coding rates when compared to some conventional MIMO systems. As a result of improved BER performance, various embodiments of the invention may also enable higher information transfer rates between a transmitting MIMO wireless device and a receiving MIMO wireless device via a wireless medium.

Givens matrices may be utilized to reduce a quantity of information communicated in feedback information via an uplink RF channel. The feedback information may comprise specifications for a feedback beamforming matrix that may be utilized when transmitting signals via a corresponding downlink RF channel. The feedback beamforming matrix may represent a rotated version of an un-rotated beamforming matrix. The Givens matrices may be utilized to apply one or more Givens rotations to un-rotated beamforming matrix. The feedback beamforming matrix may be computed based on a matrix product of a plurality of Givens matrices. The feedback beamforming matrix may comprise comparable information content to the un-rotated beamforming matrix. The feedback beamforming matrix may be encoded utilizing fewer bits than may be required to encode the un-rotated beamforming matrix. Various embodiments of the invention may be utilized in wireless communications systems, including wireless data communications systems.

Feedback information may be utilized to reduce the likelihood that signals Y will be transmitted incorrectly during beamforming. Feedback comprises a mechanism by which a receiving WLAN device A may compute a channel estimate matrix $H_{down}$. The computed channel estimate matrix may be utilized to compute feedback information that may be utilized by the WLAN device B to configure a beamforming matrix associated with the downlink RF channel. The feedback information may be communicated from the WLAN device A to the WLAN device B via the uplink RF channel. The feedback information may comprise a full description of the downlink RF channel. A full description of the downlink RF channel may comprise a frequency channel estimate for each subcarrier frequency associated with each spatial stream contained in the downlink RF channel. Each frequency channel estimate may be characterized in a Cartesian coordinate format, or in a polar coordinate format. In the Cartesian coordinate format, each frequency channel estimate may be represented as an in-phase (I) amplitude component, and a quadrature (Q) phase amplitude component. In the polar coordinate format, each frequency channel estimate may be represented as a magnitude ($\rho$) component, and an angle ($\theta$) component.

In some conventional systems, a large quantity of feedback information may be communicated in the feedback direction. RF channel bandwidth that is dedicated for use in communicating feedback information may reduce the quantity of other types of information that may be communicated between the WLAN device A and the WLAN device B within a given time interval. The feedback information may be referred to as overhead within the uplink RF channel. The overhead may reduce the information transfer rate between the WLAN device A and the WLAN device B associated with non-feedback information.

FIG. 1 is a block diagram of an exemplary system for wireless data communications, which may be utilized in connection with an embodiment of the invention. With reference to FIG. 1, there is shown a distribution system (DS) 110, an extended service set (ESS) 120, and an IEEE 802.x LAN 122. The ESS 120 may comprise a first basic service set (BSS) 102, and a second BSS 112. The first BSS 102 may comprise a first 802.11 WLAN station 104, a second 802.11 WLAN station 106, and an access point (AP) 108. The second BSS 112 may comprise a first 802.11 WLAN station 114, a second 802.11 WLAN station 116, and an access point (AP) 118. The IEEE 802 LAN 122 may comprise a LAN station 124, and a portal 126. An IEEE 802.11 WLAN station, or IEEE 802.11 WLAN device, is a WLAN system that may be compliant with at least a portion of the IEEE 802.11 standard.

A WLAN is a communications networking environment that comprises a plurality of WLAN devices that may communicate wirelessly via one or more uplink and/or downlink RF channels. The BSS 102 or 112 may be part of an IEEE 802.11 WLAN that comprises at least 2 IEEE 802.11 WLAN stations, for example, the first 802.11 WLAN station 104, the second 802.11 WLAN station 106, and the AP 108, which may be members of the BSS 102. Non-AP stations within BSS 102, the first 802.11 WLAN station 104, and the second 802.11 WLAN station 106, may individually form an association with the AP 108. An AP, such as AP 108, may be implemented as an Ethernet switch, bridge, or other device in a WLAN, for example. Similarly, non-AP stations within BSS 112, the first 802.11 WLAN station 114, and the second 802.11 WLAN station 116, may individually form an association with the AP 118. Once an association has been formed between a first 802.11 WLAN station 104 and an AP 108, the AP 108 may communicate reachability information about the first 802.11 WLAN station 104 to other APs associated with the ESS 120, such as AP 118, and portals such as the portal 126. The WLAN station 104 may subsequently communicate information wirelessly via the BSS 102. In turn, the AP 118 may communicate reachability information about the first 802.11 WLAN station 104 to stations in BSS 112. The portal 126, which may be implemented as, for example, an Ethernet switch or other device in a LAN, may communicate reachability information about the first 802.11 WLAN station 104 to stations in LAN 122 such as the 802 LAN station 124. The communication of reachability information about the first 802.11 WLAN station 104 may enable WLAN stations that are not in BSS 102, but are associated with ESS 120, to communicate wirelessly with the first 802.11 WLAN station 104.

The DS 110 may provide an infrastructure which enables a first 802.11 WLAN station 104 in one BSS 102, to communicate wirelessly with a first 802.11 WLAN station 114 in another BSS 112. The DS 110 may also enable a first 802.11 WLAN station 104 in one BSS 102 to communicate with an 802 LAN station 124 in an IEEE 802 LAN 122, implemented as, for example a wired LAN. The AP 108, AP 118, or portal 126 may provide a means by which a station in a BSS 102, BSS 112, or LAN 122 may communicate information via the DS 110. The first 802.11 WLAN station 104 in BSS 102 may communicate information wirelessly to a first 802.11 WLAN station 114 in BSS 112 by transmitting the information wirelessly to AP 108, which may transmit the information via the DS 110 to AP 118, which in turn may transmit the information wirelessly to station 114 in BSS 112. The first 802.11 WLAN station 104 may communicate information wirelessly to the 802 LAN station 124 in LAN 122 by transmitting the information wirelessly to AP 108, which may transmit the information via the DS 110 to the portal 126, which in turn may transmit the information to the 802 LAN station 124 in LAN 122. The DS 110 may utilize wireless communications via an RF channel, wired communications, such as IEEE 802 Ethernet, or a combination thereof.

A WLAN station or AP may utilize one or more transmitting antennas, and one or more receiving antennas when communicating information. A WLAN station or AP that utilizes a plurality of transmitting antennas and/or a plurality of receiving antennas may be referred to as a multiple input multiple output (MIMO) system.

Figure 2:
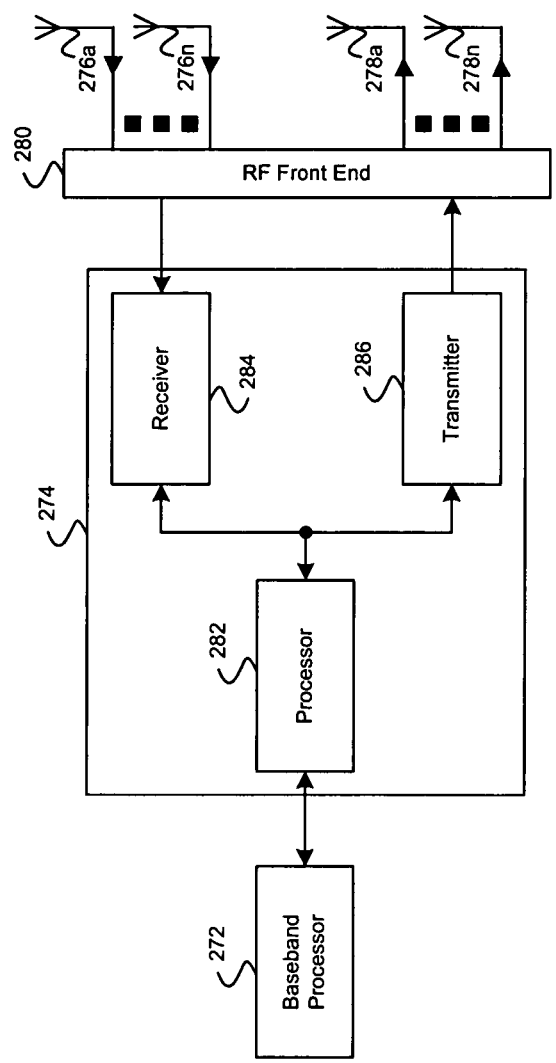
FIG. 2 is a block diagram of an exemplary MIMO system that may be utilized in connection with an embodiment of the invention.

FIG. 2 is a block diagram of an exemplary MIMO system that may be utilized in connection with an embodiment of the invention. With reference to FIG. 2 there is shown a baseband processor 272, a transceiver 274, an RF front end 280, a plurality of receiving antennas 276a, . . . , 276n, and a plurality of transmitting antennas 278a, . . . , 278n. The transceiver 274 may comprise a processor 282, a receiver 284, and a transmitter 286.

The processor 282 may perform digital receiver and/or transmitter functions in accordance with applicable communications standards. These functions may comprise, but are not limited to, tasks performed at lower layers in a relevant protocol reference model. These tasks may further comprise the physical layer convergence procedure (PLCP), physical medium dependent (PMD) functions, and associated layer management functions. The baseband processor 272 may perform functions in accordance with applicable communications standards. These functions may comprise, but are not limited to, tasks related to analysis of data received via the receiver 284, and tasks related to generating data to be transmitted via the transmitter 286. These tasks may further comprise medium access control (MAC) layer functions as specified by pertinent standards.

The receiver 284 may perform digital receiver functions that may comprise, but are not limited to, fast Fourier transform processing, beamforming processing, equalization, demapping, demodulation control, deinterleaving, depuncture, and decoding. The transmitter 286 may perform digital transmitter functions that comprise, but are not limited to, coding, puncture, interleaving, mapping, modulation control, inverse fast Fourier transform processing, beamforming processing. The RF front end 280 may receive analog RF signals via antennas 276a, ..., 276n, converting the RF signal to baseband and generating a digital equivalent of the received analog baseband signal. The digital representation may be a complex quantity comprising I and Q components. The RF front end 280 may also transmit analog RF signals via an antenna 278a, ..., 278n, converting a digital baseband signal to an analog RF signal.

In operation, the processor 282 may receive data from the receiver 284. The processor 282 may communicate received data to the baseband processor 272 for analysis and further processing. The baseband processor 272 may generate data to be transmitted via an RF channel by the transmitter 286. The baseband processor 272 may communicate the data to the processor 282. The processor 282 may generate a plurality of bits that are communicated to the receiver 284. The processor 282 may generate signals to control the operation of the modulation process in the transmitter 286, and of the demodulation process in the receiver 284.

Figure 3A:
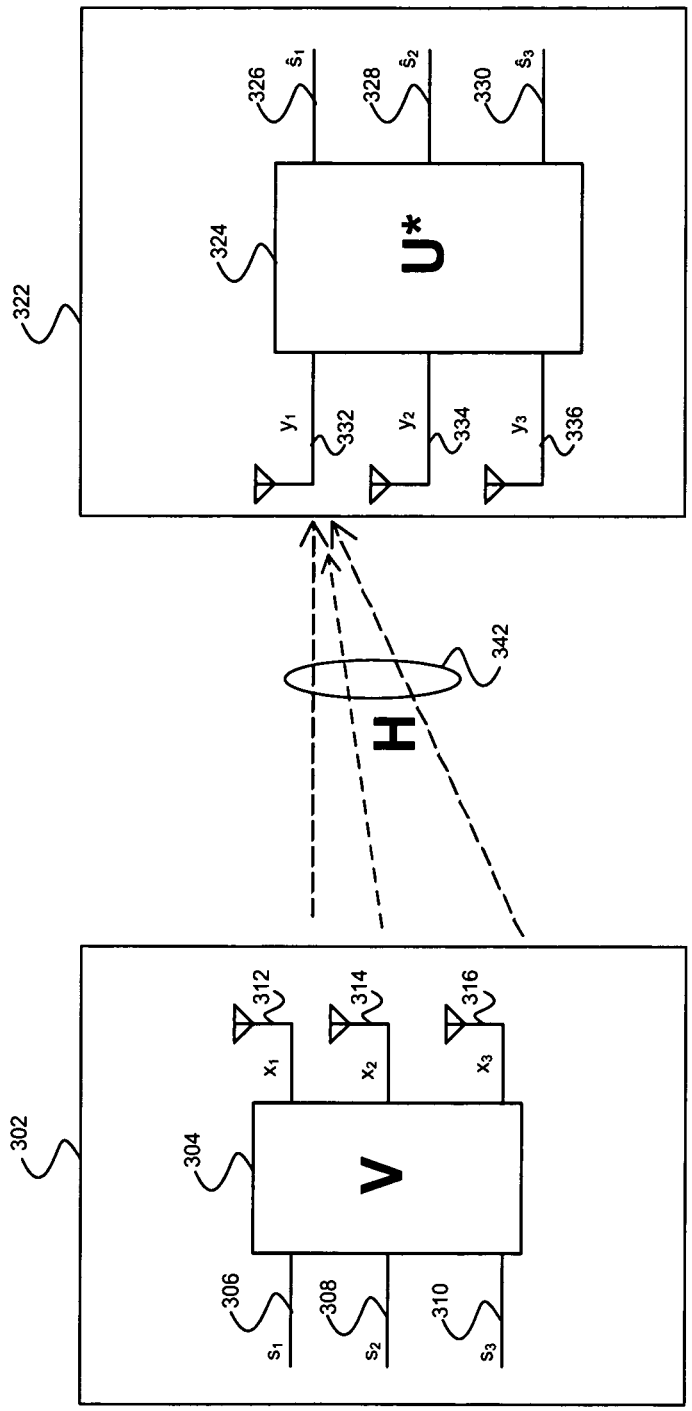
FIG. 3A is an exemplary diagram illustrating beamforming that may be utilized in connection with an embodiment of the invention.

FIG. 3A is an exemplary diagram illustrating beamforming that may be utilized in connection with an embodiment of the invention. Referring to FIG. 3A there is shown a transmitting mobile terminal 302, a receiving mobile terminal 322, and a plurality of RF channels 342. The transmitting mobile terminal 302 comprises a transmit filter coefficient block V 304, a first source signal $s_1$ 306, a second source signal $s_2$ 308, a third source signal $s_3$ 310, and a plurality of transmitting antenna 312, 314, and 316. The receiving mobile terminal 322 comprises a receive filter coefficient block U* 324, a first destination signal $\hat{s}_1$ 326, a second destination signal $\hat{s}_2$ 328, a third destination signal $\hat{s}_3$ 330, and a plurality of receiving antenna 332, 334, and 336. An exemplary mobile terminal may be a WLAN station 104, for example. A corresponding matrix V may be associated with the transmit filter coefficient block V 304. A corresponding matrix U* may be associated with the receive filter coefficient block U* 324. The matrices V and U* may be utilized in connection with beamforming.

In operation, the transmitting antenna 312 may enable transmission of a signal $x_1$, the transmitting antenna 314 may enable transmission of a signal $x_2$, and the transmitting antenna 316 may enable transmission of a signal $x_3$. In a beamforming operation, each of the transmitted signals $x_1$, $x_2$, and $x_3$ may be a function of a weighted summation of at least one of the plurality of source signals $s_1$, $s_2$, and $s_3$. The weights may be determined by the beamforming V matrix such that:

$$X=VS_S \qquad \text{equation[1a]}$$

where X may be a 3×1 vector representation of the transmitted signals $x_1$, $x_2$, and $x_3$, for example:

$$X = \begin{bmatrix} x_1 \\ x_2 \\ x_3 \end{bmatrix} \qquad \text{equation [1b]}$$

$S_S$ may be a 3×1 vector representation of the source signals $s_1$, $s_2$, and $s_3$, for example:

$$S_S = \begin{bmatrix} s_1 \\ s_2 \\ s_3 \end{bmatrix} \qquad \text{equation [1c]}$$

and V may be a 3×3 matrix representation of the beamforming V matrix, for example:

$$V = \begin{bmatrix} v_{11} & v_{12} & v_{13} \\ v_{21} & v_{22} & v_{23} \\ v_{31} & v_{32} & v_{33} \end{bmatrix} \qquad \text{equation [1d]}$$

The receiving antenna 332 may receive a signal $y_1$, the receiving antenna 334 may receive a signal $y_2$, and the receiving antenna 336 may receive a signal $y_3$. The plurality of RF channels 342 may be characterized mathematically by a transfer coefficient matrix H. The transfer coefficient matrix H may also be referred to as a channel estimate matrix.

The plurality of received signals $y_1$, $y_2$, $y_3$, may be expressed as a function of the plurality of transmitted signals $x_1$, $x_2$, $x_3$, and the transfer coefficient matrix H in the following equation, for example:

$$Y=HX+N \qquad \text{equation[2a]}$$

where Y may be a 3×1 vector representation of the received signals $y_1$, $y_2$, and $y_3$, for example:

$$Y = \begin{bmatrix} y_1 \\ y_2 \\ y_3 \end{bmatrix} \qquad \text{equation [2b]}$$

H may be a 3×3 matrix representation of the transfer coefficient matrix, for example:

$$H = \begin{bmatrix} h_{11} & h_{12} & h_{13} \\ h_{21} & h_{22} & h_{23} \\ h_{31} & h_{32} & h_{33} \end{bmatrix} \qquad \text{equation [2c]}$$

and N may be a 3×1 vector representation of noise that may exist in the communications medium, for example:

$$N = \begin{bmatrix} n_1 \\ n_2 \\ n_3 \end{bmatrix} \qquad \text{equation [2d]}$$

When utilizing singular value decomposition (SVD), the matrix H from equation[2a] may be represented as in the following equation:

$$H = USV^*$$

equation[3a]

where U may represent a column orthogonal matrix, V* may represent an Hermitian transpose of an orthogonal matrix V, and S may represent a diagonal matrix, for example. The matrix S may comprise a plurality of nonzero matrix diagonal elements, the values of which may correspond to at least a portion of singular values associated with the matrix H.

A matrix V may be represented according to the following equation:

$$V = \underline{V}D$$

equation[3b]

where D may represent a diagonal steering matrix. The matrix V may represent a rotated version of the matrix V. Each of the rows within the matrix V may comprise one or more matrix elements that may each be represented as a complex number. The matrix may D rotate the matrix V such that the last row of the matrix V may comprise a corresponding number of matrix elements, each of which may be represented as a real number. The matrix V may be referred to as being phase invariant based on the equation[3b].

A matrix U may be similarly represented by a matrix multiplication product of the matrix U, and the steering matrix D.

The equation[3a] may be represented:

$$H = UDS D^* V^*$$

equation[4]

Various embodiments of the invention may utilize decomposition methods other than SVD. The embodiments may include utilizing methods based on geometric mean decomposition (GMD), for example. When utilizing GMD, the matrix S may be represented as in the following equation:

$$S = QRP^*$$

equation[5]

where matrices Q and P may represent column orthogonal matrices, and the matrix R may represent an upper diagonal matrix. The matrix elements associated with the matrix R may each be represented as a real number. Values associated with each of the diagonal matrix elements in the matrix R may be equal such that $r_{ii} = r_{jj}$, where $r_{ii}$ may represent an $i^{th}$ diagonal matrix element and $r_{jj}$ may represent a value associated with a $j^{th}$ diagonal matrix element. The value associated with a diagonal matrix element may be about equal to a geometric mean value for at least a portion of the singular values associated with the matrix S. When utilizing GMD, one representation of the equation[3a] may be as shown in the following equation:

$$H = UQDRD^*P^*V^*$$

equation[6a]

where the beamforming V matrix may be defined:

$$V = \underline{V} PD$$

equation[6b]

and the beamforming U matrix may be defined:

$$U = \underline{U}QD$$

equation[6c]

In the equation[6a], the matrix S, from equation[3a] may be equal to the matrix multiplication product $QDRD^*P^*$. This product may further be represented as the matrix R, a matrix multiplication product QD and a matrix multiplication product $D^*P^*$. The matrix multiplication product $D^*P^*$ may represent a rotated version of the matrix P*. However, the matrix P, as represented in equations [5] and [6a], may not possess a property of phase invariance that would ensure that a matrix computed based on the matrix multiplication product $DRD^*$ is a real-valued matrix. Consequently, the matrix computed based on the matrix multiplication product $DRD^*$ from equation[6a] may comprise one or more matrix elements, the values of which may each be represented as a complex number.

When utilizing GMD, another representation of the equation[3a] may be as shown in the following equation:

$$H = UDQRP^*D^*V^*$$

equation[6d]

In the equation[6d], the matrix H may be represented as a matrix multiplication product of the matrix multiplication product QRP*, the matrix multiplication product UD, and the matrix multiplication product $D^*V^*$. The matrix multiplication product $D^*V^*$ may possess the phase invariant property as indicated in equation[3b]. As a result, the matrix R in equation[6d] may comprise matrix elements, the values of which may each be represented as a real number.

Various metrics may be defined based on equation[6d]. One metric may be based on the matrix multiplication product $P^*D^*V^*$. This metric may be utilized in connection with the matrix V this is associated with the transmit filter coefficient block V 304 as in the following equation:

$$V = \underline{V}DP$$

equation[7a]

where the matrix VDP may be derived based on the matrix multiplication product $P^*D^*V^*$.

Another metric may be based on the matrix multiplication product UDQ This metric may be utilized in connection with the matrix U*, associated with the receive filter coefficient block U* 324 as in the following equation:

$$U^* = Q^*D^*U^*$$

equation[7b]

where the matrix $Q^*D^*U^*$ may be derived based on the matrix multiplication product UDQ.

In various embodiments of the invention, the metric VDP may be utilized by a receiver 322 for sending channel feedback information to a transmitter 302. The metric VDP may be computed based on the matrix multiplication product $P^*D^*V^*$. The transmitter 302 may utilize the feedback information when transmitting subsequent signals to the receiver 322. Based on the matrix V, as in equation[7a], the transmitter 302 may transmit subsequent spatial streams $s_1$, $s_2$, and $s_3$ such that the signals transmitted via the corresponding transmitting antennas 312, 314, and 316 are each characterized by approximately equal signal strength and/or SNR measurements. A signal strength and/or SNR may be measured in decibels (dB), for example. The metric UDQ may be utilized at the receiver 322 when receiving the subsequent signals transmitted by the transmitter 302.

In a MIMO system that utilizes beamforming as shown in FIG. 3A, the values associated with the matrices V, H, and U* may be such that the value of the transmitted signal $s_i$ may be approximately equal to the value of the corresponding received signal $\hat{s}_i$, where the index i may indicate an $i^{th}$ spatial stream. In various embodiments of the invention that utilize GMD, the matrix V, associated with the transmit filter coefficient block V 304, may be computed based on the metric $\underline{V}\underline{D}P$, and the matrix U*, associated with the receive filter coefficient block U* 324, may be computed based on the metric $\underline{U}\underline{D}Q$ as shown in equations [7a] and [7b]. The receiver 322 may compute a channel estimate, $H_{down}$, for a downlink RF channel based on a received signal from the transmitter 302. The transmitter 302 may compute a channel estimate, $H_{up}$, for an uplink RF channel based on a received signal from the receiver 322. The transmit filter coefficient block V 304 may set values associated with the matrix V, utilized for communications via the downlink RF channel, based on the channel estimate $H_{up}$.

When the receiver 322 sends feedback information to the transmitter 302 via the uplink RF channel, the receiver 322 may compute values associated with a matrix V that may be based on the channel estimate $H_{down}$. The receiver 322 may subsequently communicate the computed matrix V to the transmitter 302 via the uplink RF channel. The transmitter 302 may subsequently set values associated with the matrix V, utilized for communications via the downlink RF channel, based on the channel estimate $H_{down}$.

Figure 3B:
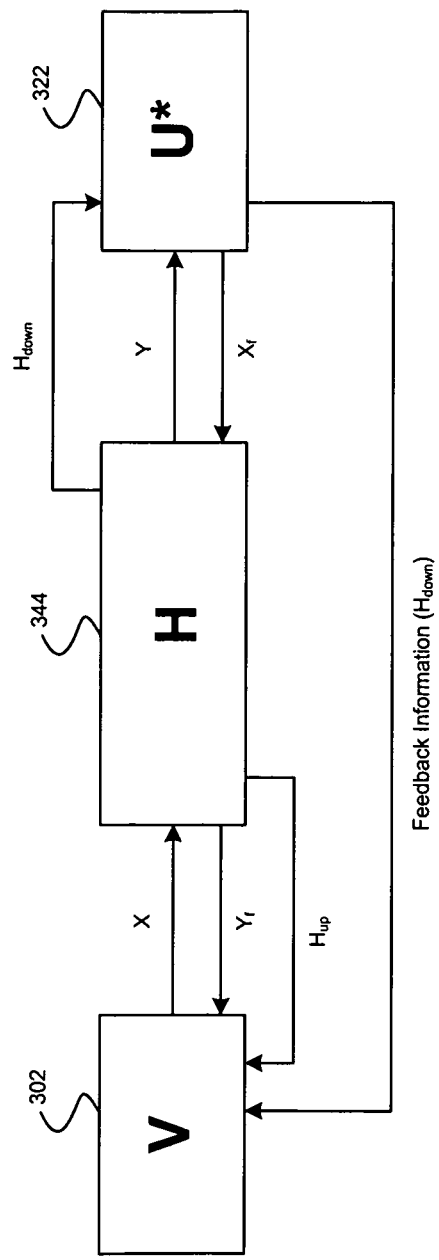
FIG. 3B is an exemplary diagram illustrating channel feedback, which may be utilized in connection with an embodiment of the invention.

FIG. 3B is an exemplary diagram illustrating channel feedback, which may be utilized in connection with an embodiment of the invention. Referring to FIG. 3B, there is shown a transmitting mobile terminal 302, a receiving mobile terminal 322, and a communications medium 344. The communications medium 344 may represent a wireless communications medium. The transmitting mobile terminal 302 may transmit a signal vector X to the receiving mobile terminal 322 via the communications medium 344. The communications direction from the transmitting mobile terminal 302 to the receiving mobile terminal 322 may be referred to as a downlink direction. The signal vector X may comprise a plurality of spatial streams simultaneously transmitted via transmitting antennas 312, 314 and 316, for example. The signal vector X may be beamformed by the transmitting mobile terminal 302 based on a beamforming matrix V. The signal vector X may travel through the communications medium 344. The signal vector X may be altered while traveling through the communications medium 344. The transmission characteristics associated with the communications medium 344 may be characterized by a transfer function H. The signal vector X may be altered based on the transfer function H. In the downlink direction, the transfer function H may be referred to as $H_{down}$. The altered signal vector X may be represented as the signal Y. The receiving mobile terminal 322 may receive the signal Y. The receiving mobile terminal 322 may determine one or more values associated with the transfer function $H_{down}$ based on the signal Y received via the communications medium 344.

The receiving mobile terminal 322 may compute one or more values associated with a matrix V based on the information related to the transfer function $H_{down}$. The receiving mobile terminal 322 may communicate information related to the matrix V to the transmitting mobile terminal 302 as feedback information. The feedback information ($H_{down}$) may represent feedback information based on the information related to the transfer function $H_{down}$. The receiving mobile terminal 322 may communicate the feedback information ($H_{down}$) via a transmitted signal vector $X_f$. The transmitted signal vector $X_f$ may be transmitted to the transmitting mobile terminal 302 via the communications medium 344. The signal vector $X_f$ may be altered while traveling through the communications medium 344. The communications direction from the receiving mobile terminal 322 to the transmitting mobile terminal 302 may be referred to as an uplink direction. The signal vector $X_f$ may be altered based on the transfer function H. In the uplink direction, the transfer function H may be referred to as $H_{up}$. The altered signal vector $X_f$ may be represented as the signal $Y_f$. The transmitting mobile terminal 302 may receive the signal $Y_f$.

The transmitting mobile terminal 302 may determine one or more values associated with the transfer function $H_{up}$ based on the signal $Y_f$ received via the communications medium 344. The transmitting mobile terminal 302 may utilize the received feedback information ($H_{down}$) to beamform subsequent signal vectors X, which may be transmitted in the downlink direction from the transmitting mobile terminal 302 to the receiving mobile terminal 322.

Various embodiments of the invention may reduce the quantity of feedback information that may be communicated from the receiver 322 to the transmitter 302 via the uplink RF channel. In one aspect of the invention, the computed metric $\underline{V}\underline{D}P$ may be represented based on a product of Givens matrices:

$$V = G_1(\psi_1) G_2(\psi_2) D_1(\phi_1, \phi_2, \ldots, \phi_N) \qquad \text{equation[8]}$$

where $G_j(\psi_j)$ may represent a Givens matrix associated with a rotation angle $\psi_j$, and $D_1(\phi_k)$ may represent a diagonal matrix with phase shift angles $\phi_k$.

The feedback information communicated by the receiver 322 may comprise encoded rotation angles $\psi_j$. The transmitter 302 may utilize the encoded rotation angles to reconstruct the matrix V based on the feedback information.

Figure 3C:
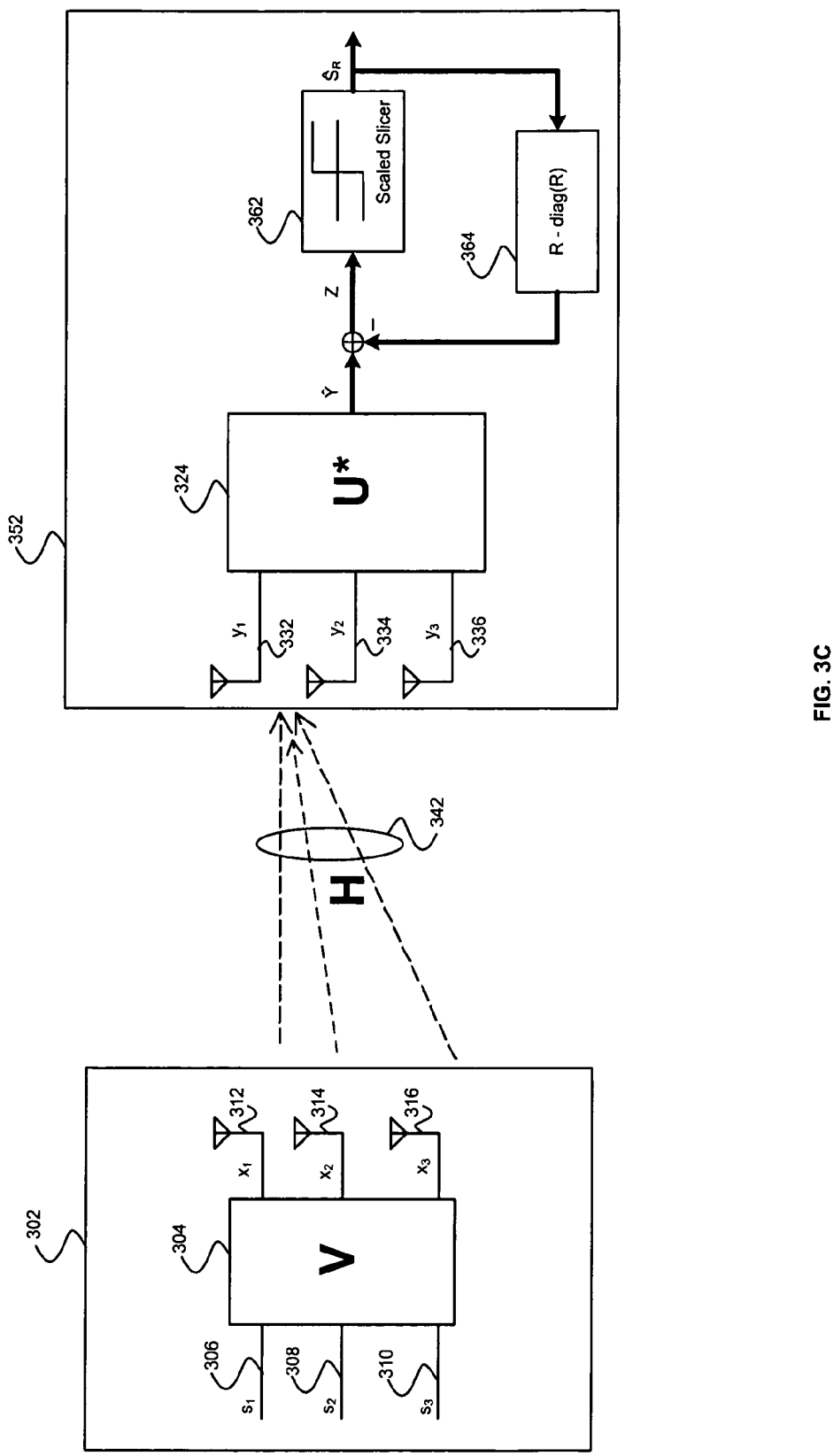
FIG. 3C is an exemplary diagram illustrating a system for GMD beamforming, in accordance with an embodiment of the invention.

FIG. 3C is an exemplary diagram illustrating a system for GMD beamforming, in accordance with an embodiment of the invention. Referring to FIG. 3C there is shown a transmitting mobile terminal 302, a receiving mobile terminal 352, and a plurality of RF channels 342. The transmitting mobile terminal 302 comprises a transmit filter coefficient block V 304, a first source signal $s_1$ 306, a second source signal $s_2$ 308, a third source signal $s_3$ 310, and a plurality of transmitting antenna 312, 314, and 316. The receiving mobile terminal 352 comprises a receive filter coefficient block U* 324, a plurality of receiving antenna 332, 334, and 336, a scaled slicer block 362, and a matrix subtraction block 364.

The scaled slicer block 362 may enable detection of a received estimated signal $\hat{s}_i$, where the index i may represent an $i^{th}$ received signal among a plurality of signals received simultaneously from the transmitter 302. The scale factor utilized by the scaled slicer block 362 may be based on a value associated with a diagonal matrix element from the upper triangular matrix R. The matrix R may be defined as in connection with equation[5]. The group of received signals $\hat{s}_i$ may be represented as a received signal vector $\hat{S}_R$. The matrix subtraction block 364 may enable cancellation of a detected component signal $\hat{s}_i$ from the signal vector $\hat{S}_R$. The matrix subtraction block 364 may subtract a value corresponding to a diagonal matrix element $r_{ii}$ from the upper triangular matrix R. The value associated with each diagonal matrix element $r_{ii}$ may be about equal.

An exemplary N×N upper triangular matrix R may be represented as follows:

$$R = \begin{bmatrix} r_{11} & r_{12} & \cdots & & r_{1N} \\ 0 & r_{22} & r_{23} & \cdots & r_{2N} \\ \vdots & \ddots & \ddots & & \vdots \\ 0 & \cdots & & 0 & r_{NN} \end{bmatrix} \quad \text{equation [9]}$$

In operation, the receiving mobile terminal 352 may compute estimates for the individual destination signals, $\hat{s}_i$, in the vector $\hat{S}_R$ based on a zero forcing (ZF) approach. The loop comprising the scaled slicer block 362, matrix subtraction block 364, and receive filter coefficient block U* 324 may implement a solution for the individual destination signals based on ZF as in the following equation:

$$Z = \hat{Y} - (R - \text{diag}(R))\hat{S}_R \quad \text{equation[10a]}$$

where the N×1 column vector $\hat{S}_R$, may be represented as follows:

$$\hat{S}_R = \begin{bmatrix} \hat{s}_1 \\ \hat{s}_2 \\ \vdots \\ \hat{s}_N \end{bmatrix} \quad \text{equation [10b]}$$

and where Z is an N×1 column vector generated based on ZF, and diag(T) a version of the matrix T comprising the diagonal terms of the matrix T. The vector $\hat{Y}$ may represent an N×1 column vector comprising a plurality of signals generated by the receive filter coefficient block U* 324, which may be defined as in the following equation:

$$\hat{Y} = U^* Y \quad \text{equation[11]}$$

where Y may be as defined in equation[2a], and U* may be defined as in equation[7b], for example.

When solving for each of the individual destination signals, $\hat{s}_i$, the scaled slicer block 362 may compute estimated values for Q and I components associated with the individual destination signal. For an exemplary 3×3 matrix R, and 3×1 vectors Z, $\hat{Y}$, and $\hat{S}_R$:

$$\begin{bmatrix} z_1 \\ z_2 \\ z_3 \end{bmatrix} = \begin{bmatrix} \hat{y}_1 \\ \hat{y}_2 \\ \hat{y}_3 \end{bmatrix} - \begin{bmatrix} 0 & r_{12} & r_{13} \\ 0 & 0 & r_{23} \\ 0 & 0 & 0 \end{bmatrix} \begin{bmatrix} \hat{s}_1 \\ \hat{s}_2 \\ \hat{s}_3 \end{bmatrix} \quad \text{equation [12a]}$$

where:

$$z_3 = \hat{y}_3 \quad \text{equation[12b]}$$

$$z_2 = \hat{y}_2 - r_{23}\hat{s}_3 \quad \text{equation[12c]}$$

$$z_1 = \hat{y}_1 - r_{12}\hat{s}_2 - r_{13}\hat{s}_3 \quad \text{equation[12d]}$$

By utilizing the scaled slicer block 362, an estimated value for the individual destination signal, $\hat{s}_3$, may be computed based on the value $z_3$ determined in equation[12b]. An estimated value for the individual destination signal, $\hat{s}_2$, may be computed based on the value $z_2$ determined in equation[12c]. The value $z_2$ may be computed based on the estimated value for the individual destination signal, $\hat{s}_3$. An estimated value for the individual destination signal, $\hat{s}_1$, may be computed based on the value $z_1$ determined in equation[12d]. The value $z_1$ may be computed based on the estimated value for the individual destination signals, $\hat{s}_2$ and $\hat{s}_3$.

Figure 3D:
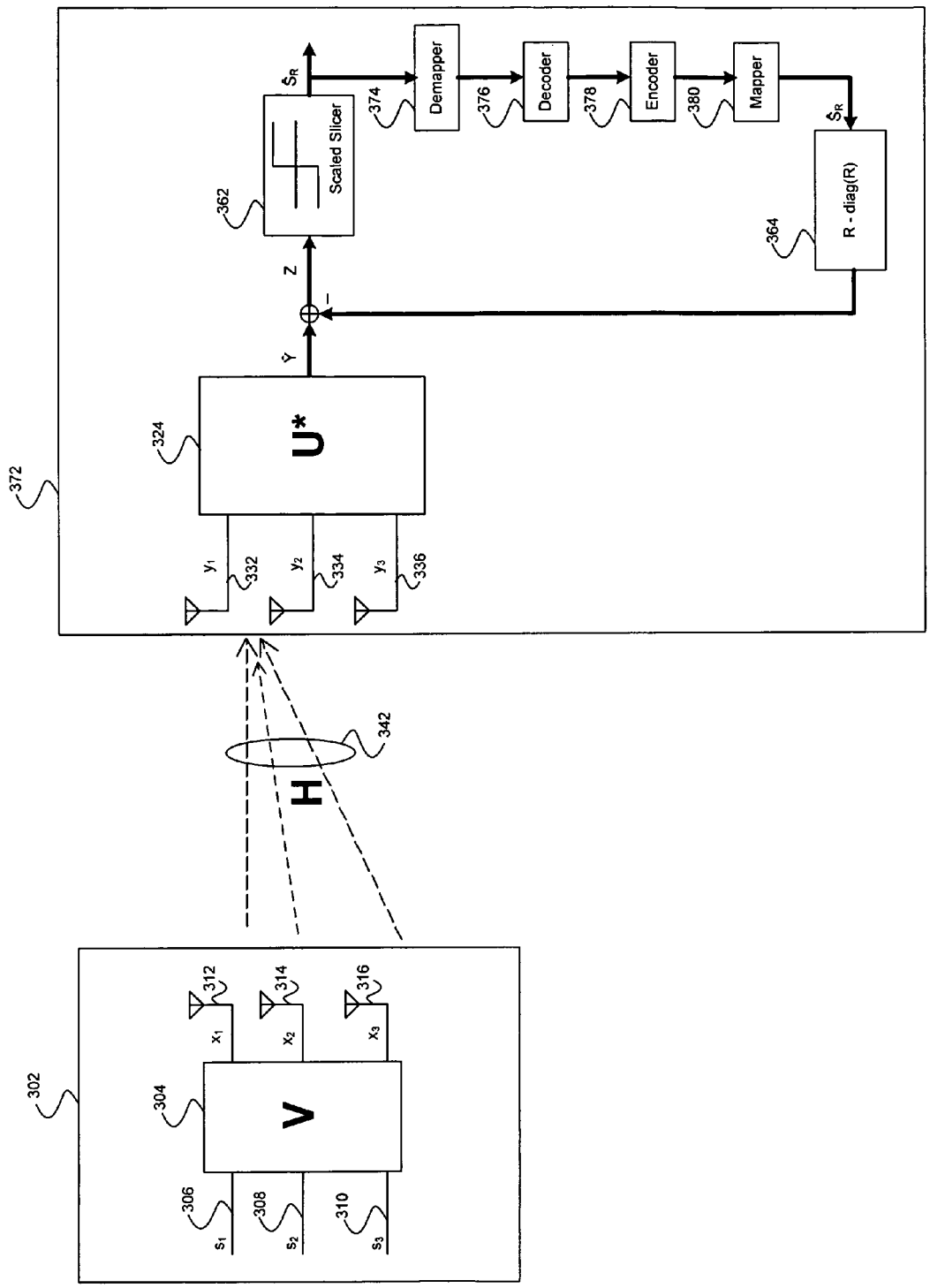
FIG. 3D is an exemplary diagram illustrating a system for GMD beamforming with decoding, in accordance with an embodiment of the invention.

FIG. 3D is an exemplary diagram illustrating a system for GMD beamforming with decoding, in accordance with an embodiment of the invention. Referring to FIG. 3D there is shown a transmitting mobile terminal 302, a receiving mobile terminal 372, and a plurality of RF channels 342. The transmitting mobile terminal 302 comprises a transmit filter coefficient block V 304, a first source signal $s_1$ 306, a second source signal $s_2$ 308, a third source signal $s_3$ 310, and a plurality of transmitting antenna 312, 314, and 316. The receiving mobile terminal 352 comprises a receive filter coefficient block U* 324, a plurality of receiving antenna 332, 334, and 336, a scaled slicer block 362, and a matrix subtraction block 364. The transmitting mobile terminal 302, and the plurality of RF channels 342 may be substantially as described in FIG. 3C. The transmit filter coefficient block V 304, the first source signal $s_1$ 306, the second source signal $s_2$ 308, the third source signal $s_3$ 310, and the plurality of transmitting antenna 312, 314, and 316 may be substantially as described in FIG. 3C. The receive filter coefficient block U* 324, the plurality of receiving antenna 332, 334, and 336, the scaled slicer block 362, and the matrix subtraction block 364 may be substantially as described in FIG. 3C. FIG. 3D also shows a demapper block 374, a decoder block 376, an encoder block 378, and a mapper block 380.

The demapper block 374 may enable transformation of a signal comprising Q and I components to a point within a constellation map. The point within the constellation map may correspond to a binary representation of the transformed signal. The transformation may be based on a demodulation technique. The binary representation may comprise encoded information.

The decoder block 376 may enable decoding of encoded information and subsequent generation of binary information. The decoding may enable the detection and/or correction of bit errors in the encoded information when generating the binary information.

The encoder block 378 may enable encoding of binary information and subsequent generation of encoded information.

The mapper block 380 may enable transformation of encoded information into a signal comprising Q and I components. The encoded information may be transformed into a representation comprising one or more symbols, wherein each symbol may correspond, or map, to a point within a constellation map. The symbols may be utilized to generate corresponding Q and I components. The transformation may be based on a modulation technique.

In operation, the receiving mobile terminal 372 may compute estimates for the individual destination signals, $\hat{s}_i$, in the vector $\hat{S}_R$ based on a zero forcing (ZF) approach. The loop comprising the scaled slicer block 362, demapper block 374, decoder block 376, encoder block 378, mapper block 380, matrix subtraction block 364, and receive filter coefficient block U* 324 may implement a solution for the individual destination signals based on ZF as in equation[10a]. The mapper block may be utilized to generate a corresponding vector $\hat{S}_R'$ based on the vector $\hat{S}_R$. The vector $\hat{S}_R'$ may comprise individual signals $\hat{s}_i'$, for example. The individual signals $\hat{s}_i'$ may correspond to the individual destination signals $\hat{s}_i$.

By utilizing the scaled slicer block 362, an estimated value for Q and I components associated with the individual destination signal, $\hat{s}_3$, may be computed based on the value $z_3$ determined in equation[12b]. The demapper block 374 may determine a constellation point that corresponds to the Q and I components. Based on the constellation point, a binary representation may be generated. The binary representation may comprise a binary estimated value for the individual destination signal, $\hat{s}_3$. The decoder block 376 may decode the binary representation to generate binary information. The demapper block 374 and/or decoder block 376 may utilize statistical techniques, for example maximum likelihood estimation. The encoder block 378 may encode the binary information decoded by the decoder block 376. The mapper block 380 may generate Q and I components associated with the constellation point determined by the demapper block 374. The signal generated by the mapper block 380 may be referred to as $\hat{s}_3'$.

An estimated value for the individual destination signal, $\hat{s}_2$, may be computed based on the value $a_2$ determined in equation[12c]. The value $a_2$ may be computed based on the estimated value for the individual destination signal $\hat{s}_3'$. The estimated value for the individual destination signal $\hat{s}_3'$, utilized in equation[12c], may be based on Q and I components generated by the mapper block 380. An estimated value for the individual destination signal, $\hat{s}_1$, may be computed based on the value $z_1$ determined in equation[12d]. The value $z_1$ may be computed based on the estimated value for the individual destination signals $\hat{s}_2'$ and $\hat{s}_3'$. The estimated values for the individual destination signals $\hat{s}_2'$ and $\hat{s}_3'$, utilized in equation [12c], may be based on Q and I components generated by the mapper block 380 for the signals $\hat{s}_2'$ and $\hat{s}_3'$, respectively.

In various embodiments of the invention, the utilization of GMD may enable the computation of the matrix R wherein each of the matrix elements contained therein may be represented as a real number. This may reduce the number of computations required at the receiver 352 when detecting individual signals $\hat{s}_i$ represented by the signal vector $\hat{S}$. When detecting the signals, matrix multiplications may utilize the matrix R and a matrix that comprises one or more matrix elements that may be represented as complex numbers. The multiplication of a real number and a complex number may involve two multiplication operations. By contrast, for a matrix R that comprises one or more complex elements, multiplication of two complex numbers may involve four multiplication operations.

In another aspect of the invention, the values associated with each of the diagonal elements in the matrix R may be equal. This may imply that the transmitter 302 may utilize equal signal gain when transmitting the spatial streams 306, 308, and 310, for example. This may further imply that the signal strength and/or signal to noise ratio (SNR) measurements associated with the transmitted spatial streams may be about equal across the plurality of transmitted spatial streams. Thus, various embodiments of the invention that utilize a GMD method may achieve higher information transfer rates, as measured in bits/second, and lower packet error rates (PER) for weaker coding rates when compared to systems that utilize an SVD method. For example, a 5/6 BCC rate may represent a weak coding rate in comparison to a 1/2 BCC rate. The 5/6 BCC method may comprise 1 redundant bit for error detection and/or correction and 5 information bits in each group of 6 transmitted bits, for example. By comparison, the 1/2 BCC method may comprise 1 redundant bit and 1 information bit in each group of 2 transmitted bits, for example.

Figure 4:
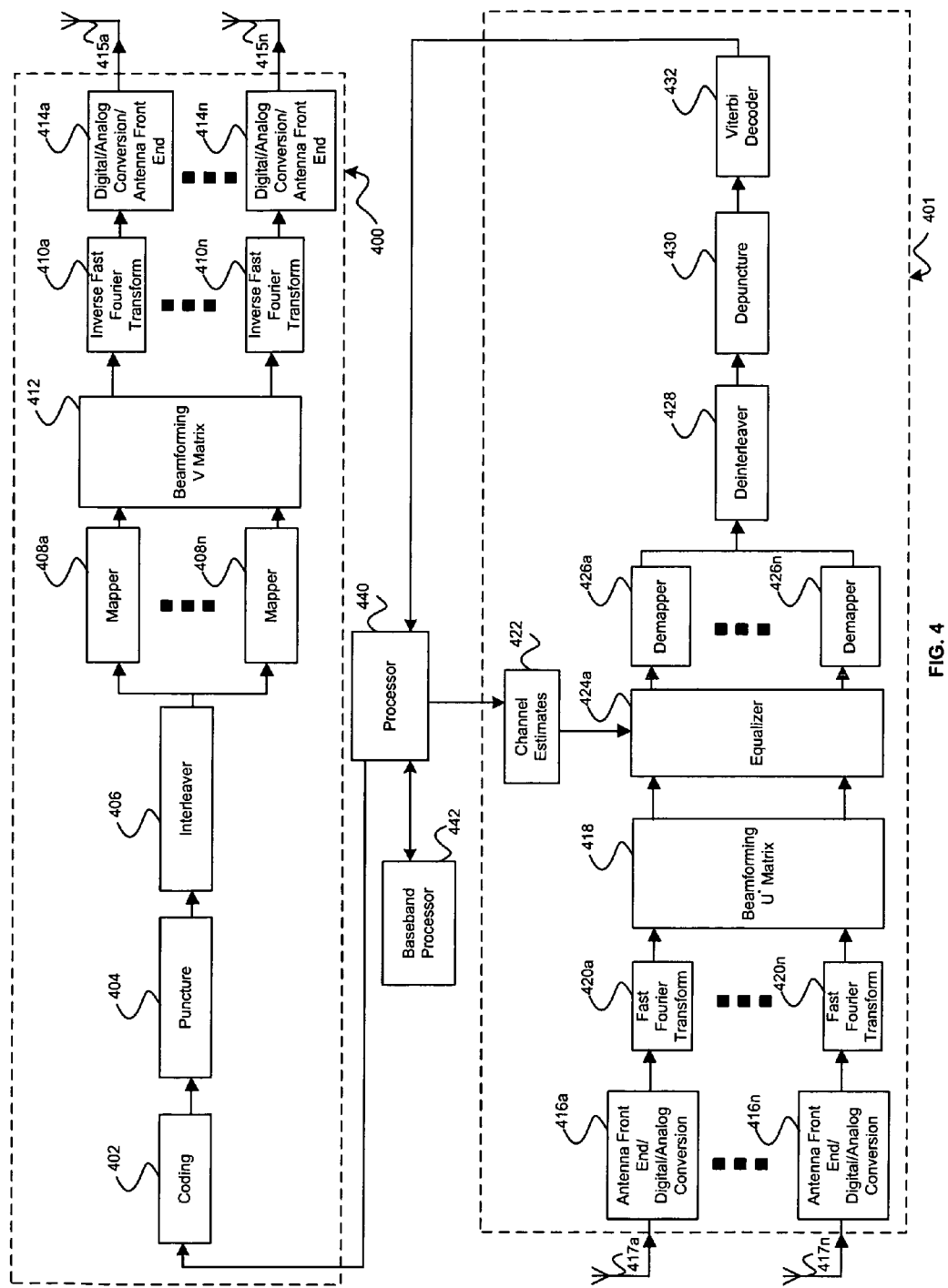
FIG. 4 is an exemplary functional block diagram of transceiver comprising a transmitter and a receiver in a MIMO system, which may be utilized in accordance with an embodiment of the invention.

FIG. 4 is an exemplary functional block diagram of transceiver comprising a transmitter and a receiver in a MIMO system, which may be utilized in accordance with an embodiment of the invention. FIG. 4 shows a transceiver comprising a transmitter 400, a receiver 401, a processor 440, a baseband processor 442, a plurality of transmitter antennas 415*a* . . . 415*n*, and a plurality of receiver antennas 417*a* . . . 417*n*. The transmitter 400 may comprise a coding block 402, a puncture block 404, an interleaver block 406, a plurality of mapper blocks 408*a* . . . 408*n*, a plurality of inverse fast Fourier transform (IFFT) blocks 410*a* . . . 410*n*, a beamforming V matrix block 412, and a plurality of digital to analog (D to A) conversion and antenna front end blocks 414*a* . . . 414*n*. The receiver 401 may comprise a plurality of antenna front end and analog to digital (A to D) conversion blocks 416*a* . . . 416*n*, a beamforming U matrix block 418, a plurality of fast Fourier transform (FFT) blocks 420*a* . . . 420*n*, a channel estimates block 422, an equalizer block 424, a plurality of demapper blocks 426*a* . . . 426*n*, a deinterleaver block 428, a depuncture block 430, and a Viterbi decoder block 432.

The variables V and U* in beamforming blocks 412 and 418 respectively refer to matrices utilized in the beamforming technique. U.S. application Ser. No. 11/052,389 filed Feb. 7, 2005, provides a detailed description of Eigenbeamforming, which is hereby incorporated herein by reference in its entirety.

The processor 440 may perform digital receiver and/or transmitter functions in accordance with applicable communications standards. These functions may comprise, but are not limited to, tasks performed at lower layers in a relevant protocol reference model. These tasks may further comprise the physical layer convergence procedure (PLCP), physical medium dependent (PMD) functions, and associated layer management functions. The baseband processor 442 may similarly perform functions in accordance with applicable communications standards. These functions may comprise, but are not limited to, tasks related to analysis of data received via the receiver 401, and tasks related to generating data to be transmitted via the transmitter 400. These tasks may further comprise medium access control (MAC) layer functions as specified by pertinent standards.

In the transmitter 400, the coding block 402 may transform received binary input data blocks by applying a forward error correction (FEC) technique, for example, binary convolutional coding (BCC). The application of FEC techniques, also known as "channel coding", may improve the ability to successfully recover transmitted data at a receiver by appending redundant information to the input data prior to transmission via an RF channel. The ratio of the number of bits in the binary input data block to the number of bits in the transformed data block may be known as the "coding rate". The coding rate may be specified using the notation $i_b/t_b$, where $t_b$ represents the total number of bits that comprise a coding group of bits, while $i_b$ represents the number of information bits that are contained in the group of bits $t_b$. Any number of bits $t_b-i_b$ may represent redundant bits that may enable the receiver 401 to detect and correct errors introduced during transmission. Increasing the number of redundant bits may enable greater capabilities at the receiver to detect and correct errors in information bits. The penalty for this additional error detection and correction capability may result in a reduction in the information transfer rates between the transmitter 400 and the receiver 401. The invention is not limited to BCC, and any one of a plurality of coding techniques, for example, Turbo coding or low density parity check (LDPC) coding, may also be utilized.

The puncture block 404 may receive transformed binary input data blocks from the coding block 402 and alter the coding rate by removing redundant bits from the received transformed binary input data blocks. For example, if the coding block 402 implemented a 1/2 coding rate, 4 bits of data received from the coding block 402 may comprise 2 information bits, and 2 redundant bits. By eliminating 1 of the redundant bits in the group of 4 bits, the puncture block 404 may adapt the coding rate from 1/2 to 2/3. The interleaver block 406 may rearrange bits received in a coding rate-adapted data block from the puncture block 404 prior to transmission via an RF channel to reduce the probability of uncorrectable corruption of data due to burst of errors, impacting contiguous bits, during transmission via an RF channel. The output from the interleaver block 406 may also be divided into a plurality of streams where each stream may comprise a non-overlapping portion of the bits from the received coding rate-adapted data block. Therefore, for a given number of bits in the coding rate-adapted data block, $b_{db}$, a given number of streams from the interleaver block 406, $n_{st}$, and a given number of bits assigned to an individual stream i by the interleaver block 406, $b_{st}(i)$, the number of bits, $b_{db}$, may equal the number of bits, $b_{st}(i)$, summed across the $n_{st}$ streams.

For a given number of coded bits before interleaving, $b_{db}$, each bit may be denoted by an index, $k=0, 1 \ldots b_{db}-1$. The interleaver block 406 may assign bits to the first spatial stream, spatial stream 0, $b_{st}(0)$, for bit indexes $k=0$, $n_{st}$, $2*n_{st}, \ldots, b_{db}-n_{st}$. The interleaver block 406 may assign bits to spatial stream 1, $b_{st}(1)$, for bit indexes $k=1$, $n_{st}+1$, $2*n_{st}+1, \ldots, b_{db}-n_{st}+1$. The interleaver block 406 may assign bits to spatial stream 2, $b_{st}(2)$, for bit indexes $k=2$, $n_{st}+2$, $2*n_{st}+2, \ldots, b_{db}-n_{st}+2$. The interleaver block 406 may assign bits to spatial stream $n_{st}$, $b_{st}(n_{st})$, for bit indexes $k=n_{st}-1$, $2*n_{st}-1, 3*n_{st}-1, \ldots, b_{db}-1$.

The plurality of mapper blocks 408a . . . 408n may comprise a number of individual mapper blocks that is equal to the number of individual streams generated by the interleaver block 406. Each individual mapper block 408a . . . 408n may receive a plurality of bits from a corresponding individual stream, mapping those bits into a "symbol" by applying a modulation technique based on a "constellation" utilized to transform the plurality of bits into a signal level representing the symbol. The representation of the symbol may be a complex quantity comprising in-phase (I) and quadrature (Q) components. The mapper block 408a . . . 408n for stream i may utilize a modulation technique to map a plurality of bits, $b_{st}(i)$, into a symbol.

The beamforming V matrix block 412 may apply the beamforming technique to the plurality of symbols, or "spatial modes", generated from the plurality of mapper blocks 408a . . . 408n. The beamforming V matrix block 412 may generate a plurality of signals where the number of signals generated may be equal to the number of transmitting antenna at the transmitter 400. Each signal in the plurality of signals generated by the beamforming V block 412 may comprise a weighted sum of at least one of the received symbols from the mapper blocks 408a . . . 408n.

The plurality of IFFT blocks 410a . . . 410n may receive a plurality of signals from the beamforming block 412. Each IFFT block 410a . . . 410n may subdivide the bandwidth of the RF channel into a plurality of n sub-band frequencies to implement orthogonal frequency division multiplexing (OFDM), buffering a plurality of received signals equal to the number of sub-bands. Each buffered signal may be modulated by a carrier signal whose frequency is based on that of one of the sub-bands. Each of the IFFT blocks 410a . . . 410n may then independently sum their respective buffered and modulated signals across the frequency sub-bands to perform an n-point IFFT thereby generating a composite OFDM signal.

The plurality of digital (D) to analog (A) conversion and antenna front end blocks 414a . . . 414n may receive the plurality of signals generated by the plurality of IFFT blocks 410a . . . 410n. The digital signal representation received from each of the plurality of IFFT blocks 410a . . . 410n may be converted to an analog RF signal that may be amplified and transmitted via an antenna. The plurality of D to A conversion and antenna front end blocks 414a . . . 414n may be equal to the number of transmitting antenna 415a . . . 415n. Each D to A conversion and antenna front end block 414a . . . 414n may receive one of the plurality of signals from the beamforming V matrix block 412 and may utilize an antenna 415a . . . 415n to transmit one RF signal via an RF channel.

In the receiver 401, the plurality of antenna front end and A to D conversion blocks 416a . . . 416n may receive analog RF signals via an antenna, converting the RF signal to baseband and generating a digital equivalent of the received analog baseband signal. The digital representation may be a complex quantity comprising I and Q components. The number of antenna front end and A to D conversion blocks 416a . . . 416n may be equal to the number of receiving antenna 417a . . . 417n.

The plurality of FFT blocks 420a . . . 420n may receive a plurality of signals from the plurality of antenna front end and A to D conversion blocks 416a . . . 416n. The plurality of FFT blocks 420a . . . 420n may be equal to the number of antenna front end and A to D conversion blocks 416a . . . 416n. Each FFT block 420a . . . 420n may receive a signal from an antenna front end and A to D conversion block 416a . . . 416n, independently applying an n-point FFT technique, and demodulating the signal by a utilizing a plurality of carrier signals based on the n sub-band frequencies utilized in the transmitter 400. The demodulated signals may be mathematically integrated over one sub band frequency period by each of the plurality of FFT blocks 420a . . . 420n to extract n symbols contained in each of the plurality of OFDM signals received by the receiver 401.

The beamforming U* block 418 may apply the beamforming technique to the plurality of signals received from the plurality of FFT blocks 420a . . . 420n. The beamforming U* block 418 may generate a plurality of signals where the number of signals generated may be equal to the number of spatial streams utilized in generating the signals at the transmitter 400. Each of the plurality of signals generated by the beamforming U* block 418 may comprise a weighted sum of at least one of the signals received from the FFT blocks 420a . . . 420n.

The channel estimates block 422 may utilize preamble information, contained in a received RF signal, to compute channel estimates. The equalizer block 424 may receive signals generated by the beamforming U* block 418. The equalizer block 424 may process the received signals based on input from the channel estimates block 422 to recover the symbol originally generated by the transmitter 400. The equalizer block 424 may comprise suitable logic, circuitry, and/or code that may enable transformation of symbols received from the beamforming U* block 418 to compensate for fading in the RF channel.

The plurality of demapper blocks 426a . . . 426n may receive symbols from the equalizer block 424, reverse mapping each symbol to one or more binary bits by applying a demodulation technique, based on the modulation technique utilized in generating the symbol at the transmitter 400. The plurality of demapper blocks 426a . . . 426n may be equal to the number of streams in the transmitter 400.

The deinterleaver block 428 may receive a plurality of bits from each of the demapper blocks 426a . . . 426n, rearranging the order of bits among the received plurality of bits. The deinterleaver block 428 may rearrange the order of bits from the plurality of demapper blocks 426a . . . 426n in, for example, the reverse order of that utilized by the interleaver 406 in the transmitter 400. The depuncture block 430 may insert "null" bits into the output data block received from the deinterleaver block 428 that were removed by the puncture block 404. The Viterbi decoder block 432 may decode a depunctured output data block, applying a decoding technique that may recover the binary data blocks that were input to the coding block 402.

In operation, the processor 440 may receive decoded data from the Viterbi decoder 432. The processor 440 may communicate received data to the baseband processor 442 for analysis and further processing. The processor 440 may also communicate data received via the RF channel, by the receiver 401, to the channel estimates block 422. This information may be utilized by the channel estimates block 422, in the receiver 401, to compute channel estimates for a received RF channel. The baseband processor 442 may generate data to be transmitted via an RF channel by the transmitter 400. The baseband processor 442 may communicate the data to the processor 440. The processor 440 may generate a plurality of bits that are communicated to the coding block 402.

The elements shown in FIG. 4 may comprise components that may be present in an exemplary embodiment of a wireless communications terminal. One exemplary embodiment of a may be a wireless communications transmitter comprising a transmitter 400, a processor 440, and a baseband processor 442. Another exemplary embodiment of a may be a wireless communications receiver comprising a receiver 401, a processor 440, and a baseband processor 442. Another exemplary embodiment of a may be a wireless communications transceiver comprising a transmitter 400, a receiver 401, a processor 440, and a baseband processor 442.

U.S. application Ser. No. 11/372,752 provides further details about RF channels utilized in MIMO communications and the construction of the feedback matrix V and is hereby incorporation in its entirety.

The Givens rotation may be represented as an N×N Givens rotation matrix, $G_{li}(\psi)$, in the following expression:

$$G_{li}(\psi_{li}) = \begin{bmatrix} I_{1-i} & 0 & 0 & 0 & 0 \\ 0 & \cos(\psi_{li}) & 0 & \sin(\psi_{li}) & 0 \\ 0 & 0 & I_{i-l-1} & 0 & 0 \\ 0 & -\sin(\psi_{li}) & 0 & \cos(\psi_{li}) & 0 \\ 0 & 0 & 0 & 0 & I_{N-i} \end{bmatrix} \quad \text{equation [13]}$$

where I may indicate a row in a matrix, i may indicate a column, $I_n$ may represent an identity matrix comprising n rows and n columns, and $\psi_{li}$ may represent a rotation angle. The value of the element located at the $I^{th}$ row and $I^{th}$ column in the matrix of equation[13] may be about equal to the value of the expression $\cos(\psi_{li})$. The value of the element located at the $i^{th}$ row and $i^{th}$ column may be about equal to the value of the expression $\cos(\psi_{li})$. The value of the element located at the $I^{th}$ row and $i_{th}$ column may be about equal to the value of the expression $-\sin(\psi_{li})$. The value of the element located at the $i^{th}$ row and $I^{th}$ column may be about equal to the value of the expression $\sin(\psi_{li})$. Each "0" indicated in the matrix of equation[13] may represent one or more matrix elements for which each corresponding value is about 0. For example, the first row of 0's in the matrix may represent a block of elements comprising I-1 rows and N-(I-1) columns for which the value of each element is about 0. A block of elements comprising 0 rows and/or 0 columns may be omitted from the matrix of equation[13].

A steering matrix may be utilized to rotate elements in a matrix such that at least a portion of the rotated elements are represented as real numbers. A matrix, V, may comprise elements that may be represented as complex numbers. The matrix V may be multiplied by an M×M column-wise steering matrix D which may be represented as follows:

$$D = \begin{bmatrix} e^{j\theta_1} & 0 & \cdots & 0 \\ 0 & e^{j\theta_2} & 0 & \vdots \\ \vdots & 0 & \ddots & 0 \\ 0 & \cdots & 0 & e^{j\theta_M} \end{bmatrix} \quad \text{equation [14]}$$

where $\theta_i$ may represent a phase shift associated with column i, e may represent a value about equal to 2.718, and j may represent the complex value equal to the square root of −1.

In an exemplary embodiment of the invention, the values for the phase shifts $\theta_i$ in equation[14] may be selected such that the matrix elements in the last row in a matrix representing the matrix multiplication product V×D may each be represented as a real number. The matrix V may be computed based on the matrix multiplication product V×D and the matrix P, as shown in equation[7a]

The matrix V may be multiplied by an N×N phase rotation matrix, $D_i$, which may be represented as follows:

$$D_i = \begin{bmatrix} I_{i-1} & 0 & \cdots & & 0 \\ 0 & e^{j\varphi_{i,i}} & 0 & & \\ \vdots & 0 & \ddots & & \vdots \\ & & & e^{j\varphi_{N-1,i}} & \\ 0 & \cdots & & & 1 \end{bmatrix} \quad \text{equation [15a]}$$

where $\phi_{a,b}$ may represent a phase shift associated with a matrix element located at row a and column b in the matrix V. For example a phase rotation $D_1$ matrix may be represented as follows:

$$D_i = \begin{bmatrix} e^{j\varphi_{1,1}} & 0 & \cdots & & 0 \\ 0 & e^{j\varphi_{2,1}} & 0 & & \\ \vdots & 0 & \ddots & & \vdots \\ & & & e^{j\varphi_{N-1,i}} & \\ 0 & \cdots & & & 1 \end{bmatrix} \quad \text{equation [15b]}$$

The result of the matrix multiplication of the matrix V by the phase rotation matrix $D_i^*$ may result in a phase shifted version of the matrix V, where $D_i^*$ may represent an Hermitian transpose of the phase shift matrix $D_i$. For example, the matrix product $D_1^*V$ may be represented as a matrix in which the values associated with elements in the first column may each be represented as a real number.

The matrix product $G_{li}(\psi_{li})D_i^*V$ may represent a Givens rotated version of the matrix that represents the matrix product $D_i^*V$. If a nonzero value is associated with an element located in the $I^{th}$ row and $i^{th}$ column of the matrix that represents the matrix product $D_i^*V$, represented as the (l,i) element, the corresponding value of the (l,i) element of the matrix that represents the matrix product $G_{li}(\psi_{li})D_i^*V$ may be about equal to 0.

One characteristic of Givens rotations is that rotations may be applied iteratively to select matrix elements for which corresponding values are to be set to about 0 as a result of successive rotations. For example, based on a current Givens rotation matrix, $G_{li}(\psi_{li})$, and a subsequent Givens matrix $G_{ki}(\psi_{ki})$, a subsequent matrix product $G_{li}(\psi_{li})G_{ki}(\psi_{ki})D_i^*V$ may be computed. The value of the (l,i) element of the matrix that represents the subsequent matrix product may be equal to about 0. The value of the (k,i) element of the matrix that represents the subsequent matrix product may also be about equal to 0.

In various embodiments of the invention, the process may be repeated until a subsequent rotated matrix is computed such that the value associated with each element I in column i is about equal to 0. The range of values for the row indicator I may be subject to the following condition:

$$N \geq l > i \qquad \text{equation[16]}$$

where N may represent the number of rows in the matrix V.

After repeating the process for each element I in column i=1, for example, a subsequent rotated matrix may be represented as follows:

$$G_{N1}(\psi_{N1})\ldots G_{31}(\psi_{31})G_{21}(\psi_{21})D_1^*V = \begin{bmatrix} 1 & 0 & \ldots & 0 \\ 0 & & & \\ \vdots & & V_2 & \\ 0 & & & \end{bmatrix} \qquad \text{equation [17a]}$$

where $V_2$ may represent an (N−1)×(M−1) submatrix.

For i=2, a submatrix $V_3$ may be computed as follows:

$$\begin{aligned}(G_{N2}(\psi_{N2})\ldots G_{42}(\psi_{32})G_{32}(\psi_{22})D_2^*) \\ (G_{N1}(\psi_{N2})\ldots G_{31}(\psi_{31})G_{21}(\psi_{21})D_1^*)V\end{aligned} = \begin{bmatrix} 1 & 0 & \ldots & 0 \\ 0 & & & \\ \vdots & & V_2 & \\ 0 & & & \end{bmatrix} \qquad \text{equation [17b]}$$

For an $i^{th}$ column, equation[17a] may be generalized and represented as follows:

$$\begin{aligned}G_{N,1}(\psi_{N1})\ldots G_{i+2,i}(\psi_{31}) \\ G_{i+1,i}(\psi_{21})D_i^*R_i\end{aligned} = \begin{bmatrix} I_i & 0 & \ldots & 0 \\ 0 & & & \\ \vdots & & V_{i+1} & \\ 0 & & & \end{bmatrix} \qquad \text{equation [18]}$$

where $R_i$ may represent an intermediate rotated matrix that corresponds to an identity matrix $I_{i-1}$, and a submatrix $V_i$. The submatrix $V_{i+1}$ may represent an (N−i)×(M−i) submatrix. For example, in equation[17b] the intermediate rotated matrix $R_2$ may be represented by the matrix product $(G_{N1}(\psi_{N2})\ldots G_{31}(\psi_{31})\,G_{21}(\psi_{21})D_1^*)V$.

In various embodiments of the invention, the process shown in equation[18] may be repeated for a subsequent column wherein the range of values for the column indicator i may be subject to the following condition:

$$\min(M,N-1) \geq i \geq 1 \qquad \text{equation[19]}$$

where N may represent the number of rows in the matrix V, M may represent the number of columns in the matrix V, and min(a,b) may represent an expression, the value of which may be the minimum value among arguments a and b.

Based on equations [13], [15a], [18], [19], and the unitary matrix property, the matrix V may be expressed based the Givens rotations according to the following equation:

$$V = \prod_{i=1}^{\min(M,N-1)} \left[ D_i \prod_{l=i+1}^{N} G_{li}^*(\psi_{li}) \right] \times \tilde{I} \qquad \text{equation [20]}$$

where $\tilde{I}$ may represent an N×M matrix comprising an identity matrix $I_{\min(N,M)}$ and either a block of max(0,N−M) rows of elements, or a block of max(0,M−N) columns of elements, with each element of a value about 0, max(a,b) may represent an expression, the value of which may be the maximum value among arguments a and b, and the operator $\pi[X_i]$ may represent a right-side matrix multiplication product among a set of matrices $X_i$. $G_{li}(\psi_{li})^*$ may represent an Hermitian transpose of the Givens rotation matrix $G_{li}(\psi_{li})$. The Givens rotation matrix $G_{li}(\psi_{li})$ is as defined in equation[13] and the phase shift matrix $D_i$ is as defined in equation[15a].

In various embodiments of the invention, feedback information may comprise values for one or more rotation angle parameters comprising one or more phase shift angles $\psi_{li}$ and one or more Givens rotation angles $\psi_{li}$. The following table represents the number of parameters that may be utilized in feedback information to represent an N×M beamforming matrix V, for exemplary values of N rows and M columns:

| Angles to be reported in feedback information | | |
|---|---|---|
| Dimensions (N × M) | Number of Parameters | Feedback Angle Parameters |
| 2 × 1 | 2 | $\phi_{11}, \psi_{21}$ |
| 2 × 2 | 2 | $\phi_{11}, \psi_{21}$ |
| 3 × 1 | 4 | $\phi_{11}, \phi_{21}, \psi_{21}, \psi_{31}$ |
| 3 × 2 | 6 | $\phi_{11}, \phi_{21}, \psi_{21}, \psi_{31}, \phi_{22}, \psi_{32}$ |
| 3 × 3 | 6 | $\phi_{11}, \phi_{21}, \psi_{21}, \psi_{31}, \phi_{22}, \psi_{32}$ |
| 4 × 1 | 6 | $\phi_{11}, \phi_{21}, \phi_{31}, \psi_{21}, \psi_{31}, \psi_{41}$ |
| 4 × 2 | 10 | $\phi_{11}, \phi_{21}, \phi_{31}, \psi_{21}, \psi_{31}, \psi_{41}, \phi_{22}, \phi_{32}, \psi_{32}, \psi_{42}$ |
| 4 × 3 | 12 | $\phi_{11}, \phi_{21}, \phi_{31}, \psi_{21}, \psi_{31}, \psi_{41}, \phi_{22}, \phi_{32}, \psi_{32}, \psi_{42}, \phi_{33}, \psi_{43}$ |
| 4 × 4 | 12 | $\phi_{11}, \phi_{21}, \phi_{31}, \psi_{21}, \psi_{31}, \psi_{41}, \phi_{22}, \phi_{32}, \psi_{32}, \psi_{42}, \phi_{33}, \psi_{43}$ |

The feedback angles represented in Table 1 may be reported for each of the $N_{sc}$ plurality of frequency subcarriers associated with the corresponding downlink RF channel. The order of angles represented in Table 1 may be determined based on the order of multiplications that may be performed when reconstructing the V matrix for each subcarrier at the WLAN 106 that receives the feedback information. For example, for given feedback angles, $\phi_{li}$ and $\psi_{li}$, the angles may be represented as a vectors of angles, $\phi_{li}[-N_{sc}/2, -N_{sc}/2+1, \ldots, -2, -1, 1, 2, \ldots, N_{sc}/2-1, N_{sc}/2]$ and $\psi_{li}[-N_{sc}/2, -N_{sc}/2+1, \ldots, -2, -1, 1, 2, \ldots, N_{sc}/2-1, N_{sc}/2]$, where $N_{sc}$ may represent the number of subcarriers associated with the downlink RF channel.

In various embodiments of the invention, the order in which feedback angles $\phi_{li}$ and $\psi_{li}$ may be reported as shown in Table 1 is exemplary, the feedback angles may be reported based on other orderings. In an exemplary embodiment of the invention, which utilizes a 4×2 beamforming matrix V, the order in which feedback angles may be reported may be represented $\phi_{11}, \phi_{21}, \psi_{21}, \phi_{22}, \phi_{31}, \psi_{31}, \phi_{41}, \psi_{41}, \phi_{32}, \psi_{32},$ and $\psi_{42}$.

Actual values for angles reported in feedback information may be determined based on a codebook. For example, a range of true values for Givens rotation angles may comprise $0 \leq \psi_{li} \leq \pi/2$. A range of true values for phase rotation angles may comprise $0 \leq \phi_{li} \leq 2\pi$, for example. Values for the Givens rotation angles may be approximated based on a binary encoding comprising a plurality of $b_\psi$ bits. Values for Givens rotation angles that are represented by a binary encoding of bits may be referred to as quantized values. In one embodiment of the invention, the range of values for binary quantized values for the Givens rotation angles may comprise $k\pi/2^{b_\psi+1} + \pi/2^{b_\psi+2}$, where k may be equal to one of a range of values comprising $0, 1, \ldots, 2^{b_\psi}-1$, for example. Values for the phase rotation angles may be approximated based on a binary encoding comprising a plurality of $b_\phi$ bits. In an embodiment of the invention, the range of values for binary quantized values for the phase rotation angles may comprise $k\pi/2^{b_\phi-1}$, where k may be equal to one of a range of values comprising $0, 1, \ldots, 2^{b_\phi}-1$, for example. Differences in value between a true value and a corresponding quantized value may be referred to as a quantization error. The potential size of a given quantization error may be based on the number of bits utilized during binary encoding.

The number of bits utilized during binary encoding of $\psi_{li}$ and during binary encoding of $\phi_{li}$ respectively may be represented as a ($b_\psi$, $b_\phi$) tuple. A tuple utilized in an exemplary codebook may comprise (1,3) to represent the combination $b_\psi=1$ and $b_\phi=3$. Other tuples in the exemplary codebook may comprise (2,4), (3,5), or (4,6).

Table 2A presents an exemplary mapping between bits contained in feedback information, and the corresponding angle that may be reported. In Table 2A, N=2, M=2, the downlink channel may be a 20 MHz RF channel, and the bits utilized may be represented by (3,5). The range $b_j \ldots b_k$ may represent a range of bit positions in the feedback information where in $b_j$ may represent the least significant bit (LSB) in the range and $b_k$ may represent the most significant bit (MSB) in the range, for example. The notation $f_p$ may represent a frequency subcarrier associated with the RF channel. Values for the index p may represent a range of integer values as determined in equations [15a] and [16]. The notation $\psi_{li}(f_p)$ may refer to a Givens rotation angle associated with frequency subcarrier $f_p$. The notation $\phi_{li}(f_p)$ may refer to a phase rotation angle associated with frequency subcarrier $f_p$.

TABLE 2A

Exemplary encoding of feedback information for 20 MHz Channel

| Feedback Bits | Angle Reported |
|---|---|
| $b_1 \ldots b_5$ | $\phi_{11}(f_{-28})$ |
| $b_6 \ldots b_{10}$ | $\phi_{11}(f_{-27})$ |
| ... | ... |
| $b_{276} \ldots b_{280}$ | $\phi_{11}(f_{28})$ |
| $b_{281} \ldots b_{283}$ | $\psi_{21}(f_{-28})$ |
| $b_{284} \ldots b_{286}$ | $\psi_{21}(f_{-27})$ |
| ... | ... |
| $b_{446} \ldots b_{448}$ | $\psi_{21}(f_{28})$ |

The exemplary feedback information shown in Table 2A contains 448 bits: 168 bits may be utilized to communicate Givens rotation angles, and 280 bits may be utilized to communicate phase rotation angles.

Various embodiments of the invention may also be utilized with tone grouping methods. U.S. application Ser. No. 11/372,752 describes tone grouping methods and is hereby incorporated herein in its entirety.

The order in which feedback angles $\phi_{li}$ and $\phi_{li}$ may be encoded as shown in Table 2A is exemplary, the feedback angles may be reported based on other orderings. Table 2B presents an exemplary mapping between bits contained in feedback information, in which the feedback angles may be grouped by frequency for a 20 MHz RF channel, and for a 4×2 beamforming matrix V.

TABLE 2B

Exemplary encoding of explicit feedback information for 20 MHz Channel

| Feedback Bits | Angle Reported |
|---|---|
| $b_1 \ldots b_4$ | $\phi_{21}(f_{-28})$ |
| $b_5 \ldots b_8$ | $\phi_{31}(f_{-28})$ |
| $b_9 \ldots b_{12}$ | $\phi_{41}(f_{-28})$ |
| $b_{13} \ldots b_{14}$ | $\psi_{21}(f_{-28})$ |
| $b_{15} \ldots b_{16}$ | $\psi_{31}(f_{-28})$ |
| $b_{17} \ldots b_{18}$ | $\psi_{41}(f_{-28})$ |
| $b_{19} \ldots b_{22}$ | $\phi_{32}(f_{-28})$ |
| $b_{23} \ldots b_{26}$ | $\phi_{42}(f_{-28})$ |
| $b_{27} \ldots b_{28}$ | $\psi_{32}(f_{-28})$ |
| $b_{29} \ldots b_{30}$ | $\psi_{42}(f_{-28})$ |
| ... | ... |

Table 3A presents an exemplary mapping between bits contained in feedback information, and the corresponding angle that may be reported. In Table 3A, N=2, M=4, the downlink channel may be a 40 MHz RF channel, and the bits utilized may be represented by (2,4). The tone grouping size may be represented by $\epsilon=4$. The range $b_j \ldots b_k$ may represent a range of bit positions in the feedback information where in $b_j$ may represent the least significant bit (LSB) in the range and $b_k$ may represent the most significant bit (MSB) in the range, for example. The notation $f_p$ may represent a frequency subcarrier associated with the RF channel. The notation $\psi_{li}(f_p)$ may refer to a Givens rotation angle associated with frequency subcarrier $f_p$. The notation $\phi_{li}(f_p)$ may refer to a phase rotation angle associated with frequency subcarrier $f_p$.

TABLE 3A

Exemplary encoding of feedback information for 40 MHz Channel

| Feedback Bits | Angle Reported |
|---|---|
| $b_1 \ldots b_4$ | $\phi_{11}(f_{-56})$ |
| ... | ... |
| $b_{113} \ldots b_{116}$ | $\phi_{21}(f_{-56})$ |
| ... | ... |
| $b_{337} \ldots b_{338}$ | $\psi_{21}(f_{-56})$ |
| ... | ... |
| $b_{505} \ldots b_{508}$ | $\phi_{22}(f_{-56})$ |
| ... | ... |
| $b_{839} \ldots b_{840}$ | $\psi_{42}(f_{56})$ |

The exemplary feedback information shown in Table 3A contains 840 bits: 280 bits may be utilized to communicate Givens rotation angles, and 560 bits may be utilized to communicate phase rotation angles.

The order in which feedback angles $\phi_{li}$ and $\psi_{li}$ may be encoded as shown in Table 3A is exemplary, the feedback angles may be reported based on other orderings. Table 3B presents an exemplary mapping between bits contained in feedback information, in which the feedback angles may be grouped by frequency for a 40 MHz channel.

TABLE 3B

Exemplary encoding of explicit feedback information for 40 MHz Channel

| Feedback Bits | Angle Reported |
|---|---|
| $b_1 \ldots b_4$ | $\phi_{21}(f_{-56})$ |
| $b_5 \ldots b_8$ | $\phi_{31}(f_{-56})$ |
| $b_9 \ldots b_{12}$ | $\phi_{41}(f_{-56})$ |
| $b_{13} \ldots b_{14}$ | $\psi_{21}(f_{-56})$ |
| $b_{15} \ldots b_{16}$ | $\psi_{31}(f_{-56})$ |
| $b_{17} \ldots b_{18}$ | $\psi_{41}(f_{-56})$ |
| $b_{19} \ldots b_{22}$ | $\phi_{32}(f_{-56})$ |
| $b_{23} \ldots b_{26}$ | $\phi_{42}(f_{-56})$ |
| $b_{27} \ldots b_{28}$ | $\psi_{32}(f_{-56})$ |
| $b_{29} \ldots b_{30}$ | $\psi_{42}(f_{-56})$ |
| ... | ... |
| $b_{811} \ldots b_{814}$ | $\phi_{21}(f_{56})$ |
| $b_{815} \ldots b_{818}$ | $\phi_{31}(f_{56})$ |
| $b_{819} \ldots b_{822}$ | $\phi_{41}(f_{56})$ |
| $b_{823} \ldots b_{824}$ | $\psi_{21}(f_{56})$ |
| $b_{825} \ldots b_{826}$ | $\psi_{31}(f_{56})$ |
| $b_{827} \ldots b_{828}$ | $\psi_{41}(f_{56})$ |
| $b_{829} \ldots b_{832}$ | $\phi_{32}(f_{56})$ |
| $b_{833} \ldots b_{836}$ | $\phi_{42}(f_{56})$ |
| $b_{837} \ldots b_{838}$ | $\psi_{32}(f_{56})$ |
| $b_{839} \ldots b_{840}$ | $\psi_{42}(f_{56})$ |

U.S. application Ser. No. 11/372,752 further details exemplary numbers of bytes contained in feedback information in accordance with various embodiments of the invention and is hereby incorporation in its entirety.

Figure 5:
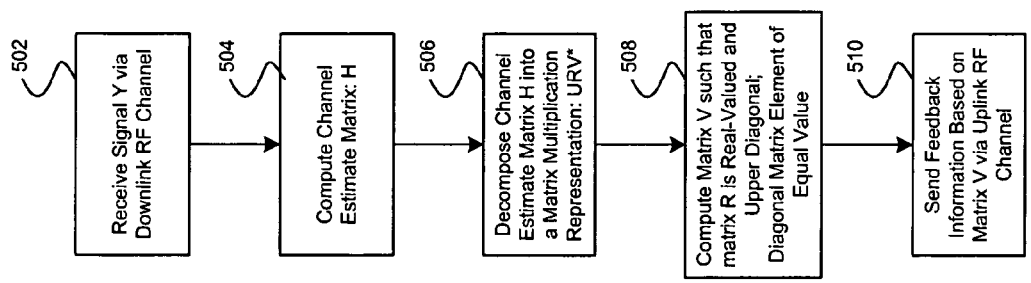
FIG. 5 is a flowchart illustrating exemplary steps for computing quantization for a general beamforming matrix in feedback information, in accordance with an embodiment of the invention.

FIG. 5 is a flowchart illustrating exemplary steps for computing quantization for a general beamforming matrix in feedback information, in accordance with an embodiment of the invention. Referring to FIG. 5, in step 502, a signal Y may be received at a receiving mobile terminal 322. In step 504, a channel estimate matrix H may be computed. In step 506, the computed channel estimate matrix may be decomposed into a matrix multiplication representation, H=URV*. In step 508, the matrix V may be computed such that the matrix R is a real valued upper diagonal matrix. A matrix may be referred to as being real valued when each of the matrix elements contained within the matrix may be represented as a real number. The values of each of the diagonal matrix elements in the matrix R, $r_{ii}$, may be about equal. In step 510, the receiving mobile terminal 322 may send feedback information based on the computed matrix V to the transmitting mobile terminal 302 via an uplink channel.

Figure 6:
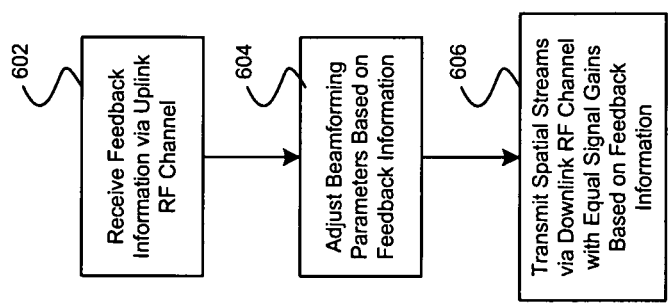
FIG. 6 is a flowchart illustrating exemplary steps for utilizing quantization for a general beamforming matrix in feedback information, in accordance with an embodiment of the invention.

FIG. 6 is a flowchart illustrating exemplary steps for utilizing quantization for a general beamforming matrix in feedback information, in accordance with an embodiment of the invention. Referring to FIG. 6, in step 602, a transmitting mobile terminal 302 may receive feedback information. In step 604, beamforming parameters may be adjusted based on the feedback information. In step 606, the transmitting mobile terminal 302 may transmit spatial streams. Each spatial stream may be transmitted with approximately equal signal gain based on the feedback information. Each transmitted spatial stream may be characterized by approximately equal signal strength and/or signal to noise ratio (SNR) measurements. The signal strength and/or SNR may be measured in decibels (dB), for example.

Various embodiments of the invention may not be limited to geometric mean decomposition (GMD) but may comprise other methods that may be utilized at a receiving mobile terminal 322 to compute feedback information based on a signal Y, received via a downlink channel. The received signal may be utilized to compute a channel estimate matrix H. The channel estimate matrix H may be decomposed into a matrix multiplication representation H=URV*. The matrix V may be computed such that the matrix R is an upper diagonal real valued matrix with equal valued diagonal matrix elements. The receiving mobile terminal 322 may send feedback information, based on the computed matrix V, to a transmitting mobile terminal 302 via an uplink channel. The receiving mobile terminal may utilize the feedback information to beamform a subsequent transmitted signal vector X. The signal vector X may comprise a plurality of transmitted spatial streams. For each transmitted spatial stream in the beamformed subsequent signal vector X, a signal strength and/or SNR measurement may be about equal to corresponding measurements associated with each of the other transmitted spatial streams.

Aspects of a system for processing signals in a communication system may comprise a processor 282 that enables receipt of a matrix for a wireless medium, which comprises a multiplicative product of at least one rotation matrix and at least one diagonal phase rotation matrix. Each of the rotation matrices comprises at least one matrix element whose value is based on a Givens rotation angle. The system may also comprise a transmitter 286 that enables transmission of a plurality of signals via the wireless medium based on feedback information. A signal strength and/or signal to noise ratio (SNR) measurement associated with each of the plurality of signals may be about equal.

A value associated with each matrix element in a last row of the received matrix may be represented as a real number. The processor 282 may enable computation of a phase rotated matrix by multiplying the received matrix by a diagonal phase rotation matrix. A value associated with each matrix element in a first column of the phase rotated matrix may be represented as a real number. The processor 282 may enable computation of a product matrix based on a multiplicative product of the phase rotated matrix and at least one phase rotation matrix. Each of the one or more phase rotation matrices may comprise at least one matrix element the value of which may be based on a Givens rotation angle. The product matrix may comprise an identity matrix and a second matrix. The second matrix may comprise one row and one column less than the received matrix.

The processor 282 may enable computation of a subsequent product matrix based on a multiplicative product of the received matrix, at least one diagonal phase rotation matrix, and at least one phase rotation matrix. The processor 282 may enable computation of a phase rotated intermediate matrix by multiplying an intermediate matrix by a corresponding one of the one or more diagonal phase rotation matrices. A value associated with each matrix element in a corresponding column of the phase rotated intermediate matrix may be represented as a real number. The subsequent product matrix may comprise an identity matrix and a subsequent matrix. The subsequent matrix may comprise at least one row and at least one column less than the received matrix.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communication system, the method comprising:
receiving a matrix for a wireless medium, which comprises a multiplicative product of at least one rotation matrix and at least one diagonal phase rotation matrix, wherein each of said at least one rotation matrix comprises at least one matrix element whose value is based on a Givens rotation angle; and
transmitting a plurality of signals via said wireless medium based on feedback information, wherein a signal to noise ratio (SNR) measurement associated with each of said plurality of signals is substantially equal.

2. The method according to claim 1, wherein a value associated with each matrix element in a last row of said received matrix is represented as a real number.

3. The method according to claim 2, further comprising computing a phase rotated matrix by multiplying said received matrix by a diagonal phase rotation matrix.

4. The method according to claim 3, wherein a value associated with each matrix element in a first column of said phase rotated matrix is represented as a real number.

5. The method according to claim 4, further comprising computing a product matrix based on a multiplicative product of said phase rotated matrix and at least one phase rotation matrix.

6. The method according to claim 5, wherein each of said at least one phase rotation matrix comprises at least one matrix element the value of which is based on a Givens rotation angle.

7. The method according to claim 5, wherein said product matrix comprises an identity matrix and a second matrix.

8. The method according to claim 7, wherein said second matrix comprises one row and one column less than said received matrix.

9. The method according to claim 1, further comprising computing a subsequent product matrix based on a multiplicative product of said received matrix, at least one diagonal phase rotation matrix, and at least one phase rotation matrix.

10. The method according to claim 9, further comprising computing a phase rotated intermediate matrix by multiplying an intermediate matrix by a corresponding one of said at least one diagonal phase rotation matrix.

11. The method according to claim 10, wherein a value associated with each matrix element in a corresponding column of said phase rotated intermediate matrix is represented as a real number.

12. The method according to claim 9, wherein said subsequent product matrix comprises an identity matrix and a subsequent matrix.

13. The method according to claim 12, wherein said subsequent matrix comprises at least one row and at least one column less than said received matrix.

14. A system for processing signals in a communication system, the system comprising:
a processor that enables receipt of a matrix for a wireless medium, which comprises a multiplicative product of at least one rotation matrix and at least one diagonal phase rotation matrix, wherein each of said at least one rotation matrix comprises at least one matrix element whose value is based on a Givens rotation angle; and
a transmitter that enables transmission of a plurality of signals via said wireless medium based on feedback information, wherein a signal to noise ratio (SNR) measurement associated with each of said plurality of signals is substantially equal.

15. The system according to claim 14, wherein a value associated with each matrix element in a last row of said received matrix is represented as a real number.

16. The system according to claim 15, wherein said processor enables computation of a phase rotated matrix by multiplying said received matrix by a diagonal phase rotation matrix.

17. The system according to claim 16, wherein a value associated with each matrix element in a first column of said phase rotated matrix is represented as a real number.

18. The system according to claim 17, wherein said processor enables computation of a product matrix based on a multiplicative product of said phase rotated matrix and at least one phase rotation matrix.

19. The system according to claim 18, wherein each of said at least one phase rotation matrix comprises at least one matrix element the value of which is based on a Givens rotation angle.

20. The system according to claim 18, wherein said product matrix comprises an identity matrix and a second matrix.

21. The system according to claim 20, wherein said second matrix comprises one row and one column less than said received matrix.

22. The system according to claim 14, wherein said processor enables computation of a subsequent product matrix based on a multiplicative product of said received matrix, at least one diagonal phase rotation matrix, and at least one phase rotation matrix.

23. The system according to claim 22, wherein said processor enables computation of an phase rotated intermediate matrix by multiplying an intermediate matrix by a corresponding one of said at least one diagonal phase rotation matrix.

24. The system according to claim 23, wherein a value associated with each matrix element in a corresponding column of said phase rotated intermediate matrix is represented as a real number.

25. The system according to claim 22, wherein said subsequent product matrix comprises an identity matrix and a subsequent matrix.

26. The system according to claim 25, wherein said subsequent matrix comprises at least one row and at least one column less than said received matrix.

* * * * *